US007574442B2

(12) United States Patent
Takeda et al.

(10) Patent No.: US 7,574,442 B2
(45) Date of Patent: Aug. 11, 2009

(54) CONTENT PROVIDING SYSTEM, CONTENT PROVIDING SERVER, INFORMATION PROCESSING APPARATUS, AND COMPUTER PROGRAM

(75) Inventors: Takashi Takeda, Kanagawa (JP); Akio Koresawa, Kanagawa (JP); Ryu Sukigara, Kanagawa (JP); Yoichi Ohshige, Kanagawa (JP)

(73) Assignee: Sony Corporation, Tokyo (JP)

( * ) Notice: Subject to any disclaimer, the term of this patent is extended or adjusted under 35 U.S.C. 154(b) by 417 days.

(21) Appl. No.: 11/176,442

(22) Filed: Jul. 8, 2005

(65) Prior Publication Data

US 2006/0026182 A1 Feb. 2, 2006

(30) Foreign Application Priority Data

Jul. 30, 2004 (JP) ............................ 2004-224294

(51) Int. Cl.
*G06F 17/30* (2006.01)

(52) U.S. Cl. ........................................................ 707/10

(58) Field of Classification Search ..................... 707/1, 707/6, 7, 9, 10, 100, 101, 102, 104.1, 200, 707/205; 709/201, 203, 223, 224, 216, 231; 348/231.4; 361/182; 379/1.02; 380/236
See application file for complete search history.

(56) References Cited

U.S. PATENT DOCUMENTS 7,076,467 B1 * 7/2006 Chatani ....................... 705/52
7,272,613 B2 * 9/2007 Sim et al. ................... 707/102
2002/0012517 A1 1/2002 Ichioka et al.
2002/0069218 A1 * 6/2002 Sull et al. ................ 707/501.1
2002/0120925 A1 * 8/2002 Logan ........................... 725/9
2002/0133491 A1 * 9/2002 Sim et al. ..................... 707/10
2003/0093790 A1 * 5/2003 Logan et al. .................. 725/38
2003/0181242 A1 * 9/2003 Lee et al. ....................... 463/42
2003/0206719 A1 11/2003 Bumgardner et al.
2004/0230572 A1 * 11/2004 Omoigui ........................ 707/3

FOREIGN PATENT DOCUMENTS

WO WO 2004/063892 A2 7/2004

OTHER PUBLICATIONS

B. Surjanto, et al., "XML Content Management based on Object-Relational Database Technology", IEEE, vol. 1, XP-010521839, Jun. 19, 2000, pp. 70-79.
Eric Rehm, "Representing Internet Streaming Media Metadata using MPEG-7 Multimedia Description Schemes", ACM International Multimedia Conference, vol. CONF. 8, XP-001003702, Nov. 4, 2000, pp. 93-98.

* cited by examiner

*Primary Examiner*—Diane Mizrahi
(74) *Attorney, Agent, or Firm*—Oblon, Spivak, McClelland, Maier & Neustadt, P.C.

(57) ABSTRACT

A content providing system includes a content providing server that delivers content data and information related thereto through a communication network; a client that downloads the content data and the information related thereto through the communication network, and a management unit that manages meta information of the respective content data as content item information, manages one or plural pieces of content item information as content program information in association with one another, and manages one or plural pieces of content program information as a content program catalogue.

9 Claims, 29 Drawing Sheets

PROGRAM INFORMATION (NO. 1)

| NO. | ITEM | REPRESENTATION IN XML | TYPE | DATA TRANSFER SOURCE | EXAMPLE |
|---|---|---|---|---|---|
| 1 | PROGRAM ID | PROGRAM ID | NUMERICAL VALUE | PROGRAM PROFILE (F) | 1234 |
| 2 | VERSION NUMBER | VERSION | NUMERICAL VALUE | PROGRAM PROFILE (F) | 10 |
| 3 | REPRESENTATIVE ITEM ID | REPRESENTATIVE FLAG | CHARACTER | PROGRAM PROFILE (F) | 0 (FALSE) 1 (TRUE) |
| 4 | PROVISION START DATE | OFFER START DAY | CHARACTER | PROGRAM PROFILE (F) | |
| 5 | PROVISION END DATE | OFFER END DAY | CHARACTER | PROGRAM PROFILE (F) | |
| 6 | ARRANGEMENT ID | BUTTON ID | NUMERICAL VALUE | PROGRAM PROFILE (F) | 1 |
| 7 | BUTTON TEXT ID | BUTTON TEXT ID | NUMERICAL VALUE | PROGRAM PROFILE (F) | 1 |
| 8 | BUTTON TEXT | BUTTON TEXT | CHARACTER STRING | PROGRAM PROFILE (F) | VIEW MAIN PROGRAM |
| 9 | ITEM ID | ITEM ID | NUMERICAL VALUE | PROGRAM PROFILE (F) | 1234 |
| 10 | MOVING IMAGE PACK FLAG | PACK FLAG | CHARACTER | PROGRAM PROFILE (F) | 0 (FALSE) 1 (TRUE) |
| 11 | MOVEMENT FLAG | MOVEMENT FLAG | NUMERICAL VALUE | PROGRAM PROFILE (F) | 0 (DISPLAY)<br>1 (REPRODUCE)<br>2 (BROWSER START) |
| 12 | VALIDATE FLAG | VALIDATE FLAG | NUMERICAL VALUE | PROGRAM PROFILE (F) | 0 (FALSE) 1 (TRUE) |
| 13 | TITLE | TITLE | CHARACTER | PROGRAM PROFILE (F) | MYOJO |
| 14 | NAME OF POST | ROLE | CHARACTER | PROGRAM PROFILE (F) | DIRECTOR |
| 15 | NAME | NAME | CHARACTER | PROGRAM PROFILE (F) | KINJI ASASAKU |
| 16 | OUTLINE | OUTLINE | CHARACTER | PROGRAM PROFILE (F) | ONCE UPON A TIME ... |
| 17 | NAME OF COUNTRY | COUNTRY | CHARACTER | PROGRAM PROFILE (F) | JAPAN |

FIG. 5

MAGAZINE LIST INFORMATION

| NO. | ITEM | REPRESENTATION IN XML | TYPE | | EXAMPLE |
|---|---|---|---|---|---|
| 1 | VERSION NUMBER | VERSION | CHARACTER | COMMON PROFILE (F) | 1023 |
| 2 | MAGAZINE ID | MAGAZINE ID | NUMERICAL VALUE | COMMON PROFILE (F)<br>INDIVIDUAL PROFILE (F) | 1234 |
| 3 | MAGAZINE MAJOR VERSION NUMBER | MAGAZINE MAJOR VERSION | NUMERICAL VALUE | COMMON PROFILE (F)<br>INDIVIDUAL PROFILE (F) | 10 |
| 4 | MAGAZINE MINOR VERSION NUMBER | MAGAZINE MINOR VERSION | NUMERICAL VALUE | COMMON PROFILE (F)<br>INDIVIDUAL PROFILE (F) | 20 |

FIG. 6

EXAMPLE OF XML REPRESENTATION OF MAGAZINE LIST

```
  <MagagineList version="1023">
  <Magazine id="1234" magerversion="10" minerversion="20"/>
  <Magazine id="5678" magerversion="11" minerversion="30"/>
</MagagineList>
```

FIG. 7

MAGAZINE INFORMATION

| NO. | ITEM | REPRESENTATION IN XML | TYPE | DATA TRANSFER SOURCE | EXAMPLE |
|---|---|---|---|---|---|
| 1 | MAGAZINE ID | MAGAZINE ID | NUMERICAL VALUE | MAGAZINE PROFILE (F) | 1234 |
| 2 | MAGAZINE MAJOR VERSION NUMBER | MAJOR VERSION | NUMERICAL VALUE | MAGAZINE PROFILE (F) | 10 |
| 3 | MAGAZINE MINOR VERSION NUMBER | MINOR VERSION | NUMERICAL VALUE | MAGAZINE PROFILE (F) | 20 |
| 4 | MAGAZINE PROVISION START DATE | OFFER START DAY | CHARACTER | MAGAZINE PROFILE (F) | 2003/8/10 |
| 5 | MAGAZINE PROVISION END DATE | OFFER END DAY | CHARACTER | MAGAZINE PROFILE (F) | 2003/9/10 |
| 6 | HEADLINE OF MAGAZINE | TITLE | CHARACTER | MAGAZINE PROFILE (F) | MOVIE INFORMATION |
| 7 | MAGAZINE DOCUMENT | TEXT | CHARACTER | MAGAZINE PROFILE (F) | NEW WORK IN AUTUMN |
| 8 | MOVING IMAGE ITEM ID FOR MAGAZINE TOP | TOP MOVIE ID | CHARACTER | MAGAZINE PROFILE (F) | 1234 |
| 9 | URI OF CLIP MOVING IMAGE OF MAGAZINE | CLIP MOVIE URI | CHARACTER | MAGAZINE PROFILE (F) | File://C:/Clip/aaa.smf |
| 10 | CLIP MOVING IMAGE STREAMING FLAG | CLIP MOVIE FLAG | CHARACTER | MAGAZINE PROFILE (F) | 0 (FALSE) 1 (TRUE) |
| 11 | URI OF STILL IMAGE OF MAGAZINE | CLIP PICTURE URI | CHARACTER | MAGAZINE PROFILE (F) | File://C:/Clip/aaa.jpg |
| 12 | SOUND FILE URI FOR STILL IMAGE | SOUND FILE | CHARACTER | MAGAZINE PROFILE (F) | File://C:/Clip/aaa.wav |
| 13 | PROGRAM ID | PROGRAM ID | NUMERICAL VALUE | MAGAZINE PROFILE (F) | 5678 |
| 14 | PROGRAM DISPLAY ORDER | DISPLAY POS | NUMERICAL VALUE | MAGAZINE PROFILE (F) | 1 |
| 15 | CONTRACT MAGAZINE FLAG | CONTRACT MAGAZINE FLAG | CHARACTER | MAGAZINE PROFILE (F) | 0 (FALSE) 1 (TRUE) |

FIG. 8

EXAMPLE OF XML REPRESENTATION OF MAGAZINE INFORMATION

```
<Magazines>
 <Magazine id="1234" magerversion="10" minerversion="20" offerstartday="2003/10/01" offerendday="2003/10/30">
   <Title>MOVIE INFORMATION</Title>
      <Text> ???? </Text>
      <TopMovie id="1234"/>
      <ClipMovie uri="File://C:/Clip/aaa.smf" flag="0"/>
      <StaticPicture uri="File://C:/Clip/aaa.jpg" soundfile=File://C:/Clip/aaa.wav/>
      <SummaryBuy flag="0"/>
      <Childs>
         <Program id="5678" displaypos="1"/>
         <Program id="9012" displaypos="2"/>
      </Childs>
   </Magazine>
   <Magazine id="6789" magerversion="10" minerversion="10" offerstartday="2003/10/01" offerendday="2003/10/30">
      <Title> ?????? </Title>
      <Text> NEW YEAR'S SPECIAL </Text>
      <TopMovie id="3456"/>
      <Clipmovie uri="File://C:/Clip/aaa.smf" flag="0"/>
      <ClipPicture uri="File://C:/Clip/aaa.jpg" soundfile=File://C:/Clip/aaa.wav/>
      <SummaryBuy flag="0"/>
      <Childs>
         <Program id="1234" displaypos="1"/>
         <Program id="4567" displaypos="2"/>
      </Childs>
   </Magazine>
</Magazines>
```

FIG. 9

PROGRAM INFORMATION (NO. 1)

| NO. | ITEM | REPRESENTATION IN XML | TYPE | DATA TRANSFER SOURCE | EXAMPLE |
|---|---|---|---|---|---|
| 1 | PROGRAM ID | PROGRAM ID | NUMERICAL VALUE | PROGRAM PROFILE (F) | 1234 |
| 2 | VERSION NUMBER | VERSION | NUMERICAL VALUE | PROGRAM PROFILE (F) | 10 |
| 3 | REPRESENTATIVE ITEM ID | REPRESENTATIVE FLAG | CHARACTER | PROGRAM PROFILE (F) | 0 (FALSE) 1 (TRUE) |
| 4 | PROVISION START DATE | OFFER START DAY | CHARACTER | PROGRAM PROFILE (F) | |
| 5 | PROVISION END DATE | OFFER END DAY | CHARACTER | PROGRAM PROFILE (F) | |
| 6 | ARRANGEMENT ID | BUTTON ID | NUMERICAL VALUE | PROGRAM PROFILE (F) | 1 |
| 7 | BUTTON TEXT ID | BUTTON TEXT ID | NUMERICAL VALUE | PROGRAM PROFILE (F) | 1 |
| 8 | BUTTON TEXT | BUTTON TEXT | CHARACTER STRING | PROGRAM PROFILE (F) | VIEW MAIN PROGRAM |
| 9 | ITEM ID | ITEM ID | NUMERICAL VALUE | PROGRAM PROFILE (F) | 1234 |
| 10 | MOVING IMAGE PACK FLAG | PACK FLAG | CHARACTER | PROGRAM PROFILE (F) | 0 (FALSE) 1 (TRUE) |
| 11 | MOVEMENT FLAG | MOVEMENT FLAG | NUMERICAL VALUE | PROGRAM PROFILE (F) | 0 (DISPLAY)<br>1 (REPRODUCE)<br>2 (BROWSER START) |
| 12 | VALIDATE FLAG | VALIDATE FLAG | NUMERICAL VALUE | PROGRAM PROFILE (F) | 0 (FALSE) 1 (TRUE) |
| 13 | TITLE | TITLE | CHARACTER | PROGRAM PROFILE (F) | MYOJO |
| 14 | NAME OF POST | ROLE | CHARACTER | PROGRAM PROFILE (F) | DIRECTOR |
| 15 | NAME | NAME | CHARACTER | PROGRAM PROFILE (F) | KINJI ASASAKU |
| 16 | OUTLINE | OUTLINE | CHARACTER | PROGRAM PROFILE (F) | ONCE UPON A TIME ... |
| 17 | NAME OF COUNTRY | COUNTRY | CHARACTER | PROGRAM PROFILE (F) | JAPAN |

FIG. 10

PROGRAM INFORMATION (NO. 2)

| NO. | ITEM | REPRESENTATION IN XML | TYPE | DATA TRANSFER SOURCE | EXAMPLE |
|---|---|---|---|---|---|
| 18 | URI OF CLIP MOVING IMAGE | CLIP MOVIE URI | CHARACTER | PROGRAM PROFILE (F) | File://C:/mov/mov1.smf |
| 19 | URI OF STILL IMAGE | CLIP PICTURE URI | CHARACTER | PROGRAM PROFILE (F) | File://C:/img/img1.jpg |
| 20 | SOUND FILE URI FOR STILL IMAGE | SOUND FILE URI | CHARACTER | PROGRAM PROFILE (F) | File://C:/clip/clip1.wav |
| 21 | EVALUATION ITEM TEXT | VOTE TEXT | CHARACTER | PROGRAM PROFILE (F) | FUNNY |
| 22 | EVALUATION | VOTE | NUMERICAL VALUE | PROGRAM PROFILE (F) | 3 |
| 23 | GENERAL EVALUATION | SYNTHETIC VOTE | NUMERICAL VALUE | PROGRAM PROFILE (F) | 4 |
| 24 | FEE GROUP ID | PRICE GROUP ID | NUMERICAL VALUE | PROGRAM PROFILE (F) | 1 |
| 25 | NECESSARY NUMBER OF COUPONS | COUPONS | NUMERICAL VALUE | PROGRAM PROFILE (F) | 2 |
| 26 | PRICE | PRICE | NUMERICAL VALUE (YEN) | PROGRAM PROFILE (F) | 500 |
| 27 | LICENSE TERM | LIC TERM | NUMERICAL VALUE | PROGRAM PROFILE (F) | 5 |

FIG. 11

EXAMPLE OF XML REPRESENTATION OF PROGRAM INFORMATION (NO. 1)

```
<Programs>
 <Program id="1234" version="10">
   <RepresentativeItem id="4567"/>
   <Buttons>
    <Button id="1" itemid="1234" packflag="0" representativeflag="0" movementflag="1"><Text id="1"> PREVIEW </Text><Button>
        <Button id="2" itemid="4567" packflag="0" representativeflag="1" movementflag="1">
           <Text id="1">DOWNLOAD</Text>
           <Text id="2">VIEW MAIN PROGRAM</Text>
        <Button>
        <!-MOVING IMAGE PACK-->
        <Button id="3" itemid="8901" packflag="1" representativeflag="0" movementflag="1"><Text id="1"> MOVING IMAGE PACK </Text><Button>
    </Buttons>
      <Title>MYOJO</Title>
      <Casts>
        <Cast role="DIRECTOR NAME">KINJI ASASAKU</Cast>
        <Cast role="ACTOR">TOSHIYUKI HIGASHIDA</Cast>
      </Casts>
      <Outline>ONCE UPON A TIME .....</Outline>
      <Clipmovie uri="http://~/clip/clip1.smf"syreamingflag="1"/>
      <Clippicture uri="File://C:/img/img1jpg"soundfile="File://C:/clip/clip1.wav"/>
      <Votes>
        <Vote text="Funny">3</Vote>
        <Vote text="Touchy">4</Vote>
        <Vote text="...">5</Vote>
        <SyntheticVote>4</SyntheticVote>
      </Votes>
      <Charges>
        <Charge groupid="1" coupons="3" price="500" licterm="3"/>
        <Charge groupid="2" coupons="6" price="1000" licterm="3"/>
      </Charges>
   </Program>
   <!-WHEN REGISTERED IN MY LIBRARY FROM RETRIEVAL RESULT, REFERENCE COUNT IS 0 BECAUSE THERE IS NO MAGAZINE SERVING AS PARENT PREVIEW-->
   <Program id="4567" version="20">
      <Parenrs counter="0"/>
      <Buttons>
        <Button id="1" itemid="1234" packflag="0" representativeflag="0" movementflag="1"><Text id="1"> PREVIEW </Text><Button>
        <Button id="2" itemid="4567" packflag="0" representativeflag="1" movementflag="1">
```

FIG. 12

EXAMPLE OF XML REPRESENTATION OF PROGRAM INFORMATION (NO. 2)

```
<Text id="1"> DOWNLOAD </TEXT>
        <Text id="2"> VIEW MAIN PROGRAM </Text>
    <Button>
</Buttons>
<Title> MYOJO </Title>
 <Casts>
   <Cast role="DIRECTOR NAME">KINJI ASASAKU</Cast>
   <Cast role="ACTOR">TOSHIYUKI HIGASHIDA</Cast>
 </Casts>
 <Outline>ONCE UPON A TIME .....</Outline>
 <ClipMovie uri="http://?/clip/clip1.smf"streamingflag="1"/>
 <ClipPicture uri="File://C:img/img1.jpg"soundfile="File://C:/clip/clip1.wav"/>
 <Votes>
   <Vote text="Funny">3</Vote>
   <Vote text="Touchy">4</Vote>
   <Vote text="...">5</Vote>
   <SyntheticVote>4</SyntheticVote>
 </Votes>
 <Charges>
   <Charge groupid="1" coupons="3" price="500" licterm="3"/>
   <Charge groupid="2" coupons="6" price="1000" licterm="3"/>
 </Charges>
    </Program>
</ProgramS>
```

FIG. 13

ITEM INFORMATION (NO. 1)

| NO. | ITEM | REPRESENTATION IN XML | TYPE | DATA TRANSFER SOURCE | EXAMPLE |
|---|---|---|---|---|---|
| 1 | MOVING IMAGE ITEM ID | ITEM ID | NUMERICAL VALUE | MOVING IMAGE ITEM PROFILE (F) | 1234 |
| 2 | VERSION NUMBER | VERSION | NUMERICAL VALUE | MOVING IMAGE ITEM PROFILE (F) | 10 |
| 3 | PRODUCT INTRODUCTION FLAG | PRODUCT INTRO FLAG | NUMERICAL VALUE (BIT) | MOVING IMAGE ITEM PROFILE (F) | 0 (FALSE) 1 (TRUE) |
| 4 | SALES CLASS (SERVICE ID) | SALES CLASS | CHARACTER | MOVING IMAGE ITEM PROFILE (F) | CHARGED |
| 5 | TITLE | TITLE | CHARACTER | MOVING IMAGE ITEM PROFILE (F) | MYOJO |
| 6 | NAME OF POST | ROLE | CHARACTER | MOVING IMAGE ITEM PROFILE (F) | DIRECTOR |
| 7 | NAME | NAME | CHARACTER | MOVING IMAGE ITEM PROFILE (F) | KINJI ASASAKU |
| 8 | OUTLINE | OUTLINE | CHARACTER | MOVING IMAGE ITEM PROFILE (F) | ONCE UPON A TIME ... |
| 9 | NAME OF COUNTRY | COUNTRY | CHARACTER | MOVING IMAGE ITEM PROFILE (F) | JAPAN |
| 10 | URI OF MOVING IMAGE | MOVIE URI | CHARACTER | MOVING IMAGE ITEM PROFILE (F) | File://C:/mov/mov1.smf |
| 11 | MOVING IMAGE STREAMING FLAG | MOVING STREAMING FLAG | CHARACTER | MOVING IMAGE ITEM PROFILE (F) | 0 (FALSE) 1 (TRUE) |
| 12 | RUNNING TIME | TIME | CHARACTER | MOVING IMAGE ITEM PROFILE (F) | 2 : 30 |
| 13 | CAPACITY | SIZE | NUMERICAL VALUE | MOVING IMAGE ITEM PROFILE (F) | 2.00 |
| 14 | URI OF CLIP MOVING IMAGE | CLIP MOVIE URI | CHARACTER | MOVING IMAGE ITEM PROFILE (F) | http://~/clip/clip1.smf |
| 15 | CLIP MOVING IMAGE STREAMING FLAG | CLIP MOVIE IMAGE STREAMING FLAG | CHARACTER | MOVING IMAGE ITEM PROFILE (F) | 0 (FALSE) 1 (TRUE) |
| 16 | URI OF STILL IMAGE | CLIP PICTURE URI | CHARACTER | MOVING IMAGE ITEM PROFILE (F) | File://C:/img/img1.jpg |

FIG. 14

ITEM INFORMATION (NO. 2)

| NO. | ITEM | REPRESENTATION IN XML | TYPE | DATA TRANSFER SOURCE | EXAMPLE |
|---|---|---|---|---|---|
| 17 | SOUND FILE URI FOR STILL IMAGE | SOUND FILE URI | CHARACTER | MOVING IMAGE ITEM PROFILE (F) | File://C:/clip/clip1.wav |
| 18 | EVALUATION ITEM TEXT | VOTE TEXT | CHARACTER | MOVING IMAGE ITEM PROFILE (F) | FUNNY |
| 19 | EVALUATION | VOTE | NUMERICAL VALUE | MOVING IMAGE ITEM PROFILE (F) | 3 |
| 20 | GENERAL EVALUATION | SYNTHETIC VOTE | NUMERICAL VALUE | MOVING IMAGE ITEM PROFILE (F) | 4 |
| 21 | FEE GROUP ID | PRICE GROUP ID | NUMERICAL VALUE | MOVING IMAGE ITEM PROFILE (F) | 1 |
| 22 | NECESSARY NUMBER OF COUPONS | NUMBER OF COUPONS | NUMERICAL VALUE | MOVING IMAGE ITEM PROFILE (F) | 2 |
| 23 | PRICE | PRICE | NUMERICAL VALUE (YEN) | MOVING IMAGE ITEM PROFILE (F) | 500 |
| 24 | LICENSE TERM | LIC TERM | NUMERICAL VALUE | MOVING IMAGE ITEM PROFILE (F) | 5 |
| 25 | URI OF DVD SALES SITE | DVD SELLING SITE URI | CHARACTER | MOVING IMAGE ITEM PROFILE (F) | http://www.somystyle.com/dvd1.html |
| 26 | URI OF RELATED GOODS SALES SITE | RELATED GOODS URI | CHARACTER | MOVING IMAGE ITEM PROFILE (F) | http://www.somystyle.com/item.html |
| 27 | MAGAZINE ID | MAGAZINE ID | NUMERICAL VALUE | MOVING IMAGE ITEM PROFILE (F) | 1234 |

FIG. 15

EXAMPLE OF XML REPRESENTATION OF ITEM INFORMATION

```
<Items>
  <Item id="1234" version="10" productintroflag="0">
    <SalesClass> CONTRACT MAGAZINE </SalesClass>
        <Title> MYOJO </Title>
        <FilmDirectors>
            <FilmDirector> KINJI ASASAKU </FilmDirector>
        </FilmDirectors>
        <Casts>
           <Cast role="DIRECTOR NAME">KINJI ASASAKU</Cast>
           <Cast role="ACTOR">TOSHIYUKI HIGASHIDA</Cast>
        </Casts>
        <Outline>ONCE UPON A TIME .....</Outline>
        <Movie uri="File://C:/?/clip/clip2.smf" streamingflag="0" size="2" time="2:00"/>
        <Clipmovie uri="http://?/clip/clip1.smf"streamingflag="1"/>
        <Clippicture uri="File://C:/img/img1.jpg"soundfile="File://C:/clip/clip1.wav"/>
        <Votes>
           <Vote text="Funny">3</Vote>
           <Vote text="Touchy">4</Vote>
           <Vote text="...">5</Vote>
           <SyntheticVote>4</SyntheticVote>
        </Votes>
        <Charges>
           <Charge groupid="1" coupons="3" price="500" licterm="3"/>
           <Charge groupid="2" coupons="6" price="1000" licterm="3"/>
        </Charges>
        <DVDSellingSite uri="http://www.sonystile.com/dvd1.html"/>
        <RelatedGoods uri="http://www.sonystile.com/item.html"/>
        ?Magazine id="1234"/>
    </Item>
</Items>
```

FIG. 16

PACK ITEM INFORMATION

| NO. | ITEM | REPRESENTATION IN XML | TYPE | DATA TRANSFER SOURCE | EXAMPLE |
|---|---|---|---|---|---|
| 1 | MOVING IMAGE PACK ID | PACKET ITEM ID | NUMERICAL VALUE | MOVING IMAGE PACK PROFILE (F) | 1234 |
| 2 | VERSION NUMBER | VERSION | NUMERICAL VALUE | MOVING IMAGE PACK PROFILE (F) | 10 |
| 3 | SALES CLASS (SERVICE ID) | SALES CLASS | CHARACTER | MOVING IMAGE PACK PROFILE (F) | CHARGED |
| 4 | TITLE OF MOVING IMAGE PACK | TITLE | CHARACTER | MOVING IMAGE PACK PROFILE (F) | SAMURAI DRAMA PACK |
| 5 | NAME OF POST | ROLE | CHARACTER | MOVING IMAGE PACK PROFILE (F) | DIRECTOR |
| 6 | NAME | NAME | CHARACTER | MOVING IMAGE PACK PROFILE (F) | KINJI ASASAKU |
| 7 | OUTLINE | OUTLINE | CHARACTER | MOVING IMAGE PACK PROFILE (F) | ONCE UPON A TIME ... |
| 8 | NAME OF COUNTRY | COUNTRY | CHARACTER | MOVING IMAGE PACK PROFILE (F) | JAPAN |
| 9 | EVALUATION ITEM TEXT | VOTE TEXT | CHARACTER | MOVING IMAGE PACK PROFILE (F) | FUNNY |
| 10 | EVALUATION | VOTE | NUMERICAL VALUE | MOVING IMAGE PACK PROFILE (F) | 3 |
| 11 | GENERAL EVALUATION | SYNTHETIC VOTE | NUMERICAL VALUE | MOVING IMAGE PACK PROFILE (F) | 4 |
| 12 | FEE GROUP ID | PRICE GROUP ID | NUMERICAL VALUE | MOVING IMAGE PACK PROFILE (F) | 1 |
| 13 | NECESSARY NUMBER OF COUPONS | COUPONS | NUMERICAL VALUE | MOVING IMAGE PACK PROFILE (F) | 2 |
| 14 | PRICE | PRICE | NUMERICAL VALUE (YEN) | MOVING IMAGE PACK PROFILE (F) | 500 |
| 15 | LICENSE TERM | LIC TERM | NUMERICAL VALUE | MOVING IMAGE PACK PROFILE (F) | 5 |
| 16 | MOVING IMAGE ITEM ID | ITEM ID | NUMERICAL VALUE | MOVING IMAGE PACK PROFILE (F) | 1234 |
| 17 | URI OF DVD SALES SITE | DVD SELLING SITE URI | CHARACTER | MOVING IMAGE PACK PROFILE (F) | http://www.somystyle.com/dvd1.html |
| 18 | URI OF RELATED GOODS SALES SITE | RELATED GOODS URI | CHARACTER | MOVING IMAGE PACK PROFILE (F) | http://www.somystyle.com/item.html |
| 19 | MAGAZINE ID | MAGAZINE ID | NUMERICAL VALUE | MOVING IMAGE PACK PROFILE (F) | 1234 |

FIG. 17

EXAMPLE OF XML REPRESENTATION OF PACK ITEM INFORMATION

```
<PackItems>
  <PackItem id="1234" version="10">
    <SalesClass> CHARGED </SalesClass>
        <Title> SAMURAI DRAMA PACK </Title>
        <FilmDirectors>
            <FilmDirector> KINJI ASASAKU </FilmDirector>
        </FilmDirectors>
        <Casts>
           <Cast role="DIRECTOR NAME">KINJI ASASAKU</Cast>
           <Cast role="ACTOR">TOSHIYUKI HIGASHIDA</Cast>
        </Casts>
        <Outline>ONCE UPON A TIME .....</Outline>
        <Votes>
           <Vote text="Funny">3</Vote>
           <Vote text="Touchy">4</Vote>
           <Vote text="...">5</Vote>
           <SyntheticVote>4</SyntheticVote>
        </Votes>
        <Charges>
           <Charge groupid="1" coupons="3" price="500" licterm="3"/>
           <Charge groupid="2" coupons="6" price="1000" licterm="3"/>
        </Charges>
        <Childs>
            <Item id="1234"/>
        </Childs>
    </PackItem>
</PackItems>
```

FIG. 18

REFERENCE COUNT MANAGEMENT TABLE

| | ITEM NAME | REPRESENTATION IN XML | 5-1-6 | 5-6-1 | 7-1-4 | 7-1-01 |
|---|---|---|---|---|---|---|
| 1 | PROGRAM ID | PROGRAM ID | RU | RD | RU | RD |
| 2 | PROGRAM REFERENCE COUNT | PROGRAM REF COUNT | U | UD | U | UD |
| 3 | MOVING IMAGE PACK ID | PACK ITEM ID | RU | RD | RU | RD |
| 4 | MOVING IMAGE PACK REFERENCE COUNT | PACK ITEM REF COUNT | U | UD | U | UD |
| 5 | MOVING IMAGE ITEM ID | ITEM ID | RU | RD | RU | RD |
| 6 | MOVING IMAGE ITEM REFERENCE COUNT | ITEM REF COUNT | U | UD | U | UD |

*FIG. 19*

MAGAZINE DELETION RULES

| | | MAGAZINE REFERENCE | |
|---|---|---|---|
| | | REFERRED | NOT REFERRED |
| LICENSE | LICENSED | ITEM : NO ACTION<br>LIC : NO ACTION<br>DATA: NO ACTION | ITEM : NO ACTION<br>LIC : NO ACTION<br>DATA: DELETE |
| | NOT LICENSED AT ALL | ITEM : NO ACTION<br>LIC : NO ACTION<br>DATA: NO ACTION | ITEM : DELETE<br>LIC : NO ACTION (NO LICENSE FROM THE BEGINNING)<br>DATA: DELETE |
| | EXPIRED | ITEM : NO ACTION<br>LIC : NO ACTION<br>DATA: NO ACTION | ITEM : DELETE<br>LIC : DELETE<br>DATA: DELETE |

FIG. 22

RULES FOR AUTOMATIC DELETION OF PROGRAM FROM MY LIBRARY

| | | PROGRAM PROVISION PERIOD | MAGAZINE REFERENCE | |
|---|---|---|---|---|
| | | | REFERRED | NOT REFERRED |
| LICENSE | LICENSED | WITHIN PERIOD | NO ACTION | NO ACTION |
| | | OUT OF PERIOD | NO ACTION | NO ACTION |
| | NOT LICENSED AT ALL | WITHIN PERIOD | NO ACTION | NO ACTION |
| | | OUT OF PERIOD | NO ACTION | DELETE |
| | EXPIRED | WITHIN PERIOD | NO ACTION | NO ACTION |
| | | OUT OF PERIOD | NO ACTION | DELETE |

FIG. 23

MY LIBRARY AUTOMATIC DELETION MANAGEMENT TABLE

| | ITEM NAME | REPRESENTATION IN XML | 5-6-1 |
|---|---|---|---|
| 1 | REFERENCE COUNT FLAG | REF FLAG | R |
| 2 | LICENSE HOLD FLAG | LIC FLAG | R |
| 3 | PROGRAM PROVISION PERIOD FLAG | OFFER PERIOD FLAG | R |
| 4 | NUMBER OF DAYS OF GRACE FOR MOVING IMAGE DATA DELETION | CONTENT DEL TERM | R |
| 5 | NUMBER OF DAYS OF GRACE FOR META DATA DELETION | META DEL TERM | R |

FIG. 24

EXAMPLE OF XML REPRESENTATION OF MY LIBRARY AUTOMATIC DELETION MANAGEMENT TABLE

```
<MyLibraryDeleteManager>
    <Term contentdel="10" metadel="20"/>
    <Conditions>
        <Conditon refflag="0" licflag="1" offerperiodflag="0" delete="1"/>
        <Conditon refflag="1" licflag="0" offerperiodflag="1" delete="0"/>
    </Conditions>
</MyLibraryDeleteManager>
```

FIG. 26

RULES FOR MANUAL DELETION FROM MY LIBRARY

| | | MAGAZINE REFERENCE | |
|---|---|---|---|
| | | REFERRED | NOT REFERRED |
| LICENSE | LICENSED | ITEM : NO ACTION<br>LIC : NO ACTION<br>DATA: DELETE | ITEM : NO ACTION<br>LIC : NO ACTION<br>DATA: DELETE |
| | NOT LICENSED AT ALL | ITEM : NO ACTION<br>LIC : NO ACTION<br>DATA: DELETE | ITEM : DELETE<br>LIC : NO ACTION (NO LICENSE FROM THE BEGINNING)<br>DATA: DELETE |
| | EXPIRED | ITEM : NO ACTION<br>LIC : NO ACTION<br>DATA: DELETE | ITEM : DELETE<br>LIC : DELETE<br>DATA: DELETE |

MY LIBRARY SCREEN (1)

MY LIBRARY SCREEN (2)

MY LIBRARY SCREEN (3)

SCREEN FOR CONFIRMATION OF DELETION FROM MY LIBRARY

SCREEN FOR COMPLETION OF DELETION FROM MY LIBRARY

CONTENT PROVIDING SYSTEM, CONTENT PROVIDING SERVER, INFORMATION PROCESSING APPARATUS, AND COMPUTER PROGRAM

CROSS-REFERENCES TO RELATED APPLICATIONS

This application contains subject matter related to Japanese Patent Application JP 2004-224294 filed in the Japanese Patent Office on Jul. 30, 2004, the entire contents of which being incorporated herein by reference.

BACKGROUND OF THE INVENTION

1. Field of the Invention

The present invention relates to a content providing system, a content providing server, an information processing apparatus, and a computer program that handle large capacity content data such as moving images.

2. Description of the Related Art

In recent years, so-called broadband (high capacity and high speed) communication networks such an optical fiber and an Asymmetric Digital Subscriber Line (ADSL) have been consolidated and widely spread. In addition, large capacity storages have been mounted on information processing apparatuses such as a personal computer and personal digital electronics. In accordance with development of such infrastructures, a service for delivering large capacity content data such as moving images through a broadband communication network attracts attentions. The conventional techniques concerning such a service for delivering large capacity content data are disclosed in JP-A-2002-118417 and JP-A-2003-217490.

SUMMARY OF THE INVENTION

When the service for delivering large capacity content data is used, a user views large capacity content data, which the user wishes to view, in a streaming system or views the large capacity content data after downloading the data to a large capacity storage. However, no matter how large a capacity of a storage of a client owned by the user is, if all large capacity content data are downloaded to the storage without restriction, excessively large burdens are applied on the storage of the client. It is also likely that the storage is filled with the large capacity content data before the user is aware and it may be impossible to download important content data.

The invention has been devised in view of such a technical background. It is desirable to provide a content providing system, a content providing server, an information processing apparatus, and a computer program, which are new and improved, capable of arranging information on large capacity content data stored in a storage and efficiently deleting unnecessary content data automatically or according to a user request to realize efficiency of storage resources of a client.

To facilitate understanding of the invention, several concepts constituting the invention will be explained schematically.

"Content data" is an information content provided from a content providing server and is a sentence, music, an image, a video, or a database represented by digital data or a set of information obtained by combining the sentence, the music, the image, the video, and the database.

"Related information of the content data" is meta data incidental to the information content provided from the content providing server and includes various kinds of information such as an ID, version information, source information, term of validity information, and license information of the content data.

A "communication network" is a public line network that makes it possible to perform tow-way communication. In the invention, since it is necessary to, for example, deliver large capacity content data, it is possible to suitably use a large capacity high-speed communication network using an optical fiber or an ADSL, a so-called broadband communication network.

A "content providing server" is an information processing apparatus that is capable of providing a client with content data through a communication network according to a request from the client or according to an event that occurs regularly or irregularly. The content providing server itself may store and manage the content data or a content management server, which stores and manages the content data, may be provided separately.

A "client" is an information processing apparatus that is capable of acquiring content data, which is delivered from the content providing server through the communication network, in a streaming system or a download system. For example, the client is constituted as an information terminal such as a personal computer, personal digital electronics, or a personal digital assistant (PDA).

A "management apparatus" is an application that can be mounted on the information processing apparatus constituting the client by download through the communication network via other media. The management unit manages content data and information related thereto in a form like a magazine according to a constitution characteristic of the invention.

"Content item information" is a concept for managing meta information related to object content data as "items or moving image items" in order to manage an object content such as a moving image file. Item information (an item) includes information on an ID and production of content data or various kinds of meta information such as a thumbnail still image or a thumbnail moving image.

A "content item information pack" is a concept for managing content item information (an item or a moving image item) that is grouped as, for example, a serial and is a concept that is introduced to improve convenience of a service by associating a series of content item information (items or moving image items) thereto as a "pack item".

"Representative content item information" is content item information (a representative item) that is displayed on a display device or the like representatively when plural pieces of content item information are associated with content program information (a program).

"Content program information" is a program for managing content item information (an item) and a content item information pack (a pack item). Examples of the content program information (a program) include pieces of content item information (items) that are associated to one another according to broader terms such as movie introduction, production introduction, drama introduction, and World Cup introduction.

A "content program catalogue" is a catalogue of content program information (programs) edited with predetermined relevance. The content program list can be compared to a "magazine" that is delivered regularly or irregularly.

A "content program catalogue list" is a list of content program catalogues (magazines) and is a "magazine list" in which content program catalogues provided by a content providing service are listed.

A "preference area" is an area in which a user can register content program information (a program) that the user has selected according to the user's preference and is a so-called "My Library".

In the following explanation, in order to facilitate conceptual understanding of the invention, the "content item information" may be referred to as an "item" or a "moving image item", the "content item information pack" may be referred to as a "pack item", the "representative content item information" may be referred to as a "representative item", the "content program information" may be referred to as a "program", the "content program catalogue" may be referred to as a "magazine", the "content program catalogue list" may be referred to as a "magazine list", and the "preference area" may be referred to as a "My Library". However, it is needless to mention that the invention should be not interpreted in a limited manner and should be interpreted on the basis of a technical idea described in the specification to the utmost.

According to an embodiment of the invention, there is provided a content providing system including a content providing server that is capable of delivering content data and information related thereto through a communication network and a client that is capable of downloading the content data and the information related thereto through the communication network.

A management unit for this content providing system manages meta information of the respective content data as content item information (an item), manages one or plural pieces of content item information as content program information (a program) in association with one another, and manages one or plural pieces of content program information as a content program catalogue (a magazine). One content data and meta information thereof can be referred to in plural pieces of content item information (items), one piece of content item information (an item) can be referred to in plural pieces of content program information (programs), and one piece of content program information (a program) can be referred to in plural content program catalogues (magazines).

According to the embodiment of the invention, when a term of availability of the content program catalogue (the magazine) has expired, the management unit deletes content program information (programs) included in the content program catalogue (the magazine) and/or content item information (items) included in the content program information (the programs) and/or content data included in the content item information (the items).

In this way, the management unit automatically deletes an object (the content program information (the program), the content item information (the item), the content data, etc.) subordinate to the content program catalogue (the magazine) the term of availability of which has expired. Thus, unnecessary data are not accumulated in a storage of a client and hardware resources of the client can be saved.

According to another embodiment of the invention, there is provided a content providing server that is capable of delivering content data and information related thereto through a communication network together with a management unit that manages the content data and the information.

The management unit provided in an information processing apparatus manages meta information of the respective content data as content item information (an item), manages one or plural pieces of content item information as content program information (a program) in association with one another, and manages one or plural pieces of content program information as a content program catalogue (a magazine). One content data and meta information thereof can be referred to in plural pieces of content item information (items), one piece of content item information (an item) can be referred to in plural pieces of content program information (programs), and one piece of content program information (program) can be referred to in plural content program catalogues (magazines).

According to the embodiment of the invention, when a term of availability of the content program catalogue (the magazine) has expired, the management unit deletes content program information (a program) included in the content program catalogue (the magazine) and/or content item information (an item) included in the content program information (the program) and/or content data included in the content item information (the item). Note that an automatic deletion function by the management unit provided in the content providing server is an example of an embodiment of the invention. It is also possible to cause the management unit of the content providing server to automatically delete the information.

In this way, the management unit automatically deletes an object (the content program information (the program), the content item information (the item), the content data, etc.) subordinate to the content program catalogue (the magazine), the term of which has expired. Thus, unnecessary data are not accumulated in a storage of a client and hardware resources of the client can be saved.

When the object (the content program information (the program), the content item information (the item), the content data, etc.) to be deleted included in the content program catalogue (the magazine) is referred to from other objects also including other content program catalogues (magazines) (content program catalogues (magazines), content program information (programs), content item information (items), content data, etc.), the management unit can suspend deletion of the object (the content program information (the program), the content item information (the item), the content data, etc.) being referred to.

According to such a constitution, in deleting an object, a state of reference to the object to be deleted from other objects is taken into account and, when the state of reference is present, the deletion is suspended. Thus, necessary objects are not deleted inadvertently.

According to still another embodiment of the invention, there is provided an information processing apparatus including a management unit that manages content data and information related thereto delivered through a communication network.

The management unit incorporated in the information processing apparatus manages meta information of the respective content data as content item information (an item), manages one or plural pieces of content item information as content program information (a program) in association with one another, and manages one or plural pieces of content program information as a content program catalogue (a magazine). One content data and meta information thereof can be referred to in plural pieces of content item information (items), one piece of content item information (an item) can be referred to in plural pieces of content program information (programs), and one piece of content program information (a program) can be referred to in plural content program catalogues (magazines)

According to the embodiment of the invention, when a term of availability of the content program catalogue (the magazine) has expired, the management unit deletes content program information (a program) included in the content program catalogue (the magazine) and/or content item information (an item) included in the content program information (the program) and/or content data included in the content item information (the item).

In this way, the management unit automatically deletes an object (the content program information (the program), the content item information (the item), the content data, etc.) subordinate to the content program catalogue (the magazine), the term of which has expired. Thus, unnecessary data are not accumulated in a storage of a client and hardware resources of the client can be saved.

When the object (the content program information (the program), the content item information (the item), the content data, etc.) to be deleted included in the content program catalogue (the magazine) is referred to from other objects also including other content program catalogues (magazines) (content program catalogues (magazines), content program information (programs), content item information (items), content data, etc.), the management unit can suspend deletion of the object (the content program information (the program), the content item information (the item), the content data, etc.) being referred to.

According to such a constitution, in deleting an object, a state of reference to the object to be deleted from other objects is taken into account and, when the state of reference is present, the deletion is suspended. Thus, necessary objects are not deleted inadvertently.

The information processing apparatus further includes a preference area (a My Library) in which desired content program information (programs) can be registered. When a term of availability of a content program catalogue (a magazine) has expired, the management unit deletes content program information (a program) and/or content item information (an item) included in the content program information (the program) and/or content data included in the content item information (the item) included in the content program catalogue (the magazine), a term of availability of which has expired, among the content program information (the programs) registered in the preference area (the My Library). Thus, unnecessary data are prevented from accumulating in a storage of a client and hardware resources can be saved.

In the deletion of a program from such a preference area (a My Library), again, when the content program information (the program) to be deleted and/or the content item information (the item) to be deleted and/or the content data to be deleted included in the content program catalogue (the magazine) is referred to from other content program catalogues (magazines) and/or content program information (programs) and/or content item information (items) and/or content data, the management unit suspends deletion of the content program information (the program) and/or the content item information (the item) and/or the content data being referred to. Thus, necessary objects are not deleted inadvertently.

According to still another embodiment of the invention, there is provided a computer program for managing a content and information related thereto, which are downloaded to a storage, with a management unit incorporated in an image processing apparatus.

In this program, again, the management unit manages meta information of the respective content data as content item information (an item), manages one or plural pieces of content item information (items) as content program information (a program) in association with one another, and manages one or plural pieces of content program information (programs) as a content program catalogue (a magazine). One content data and meta information thereof can be referred to in plural pieces of content item information (items), one piece of content item information (an item) can be referred to in plural pieces of content program information (programs), and one piece of content program information (a program) can be referred to in plural content program catalogues (magazines).

Moreover, when a term of availability of the content program catalogue (the magazine) has expired, the management unit deletes content program information (a program) included in the content program catalogue (the magazine) and/or content item information (an item) included in the content program information (the program) and/or content data included in the content item information (the item).

BRIEF DESCRIPTION OF THE DRAWINGS

In the accompanying drawings:

FIG. 5 is a table for explaining a list of object data of magazine list information according to the preferred embodiment;

FIG. 6 is a diagram for explaining an XML representation of the object data of the magazine list information according to the preferred embodiment;

FIG. 7 is a table for explaining a list of object data of magazine information according to the preferred embodiment;

FIG. 8 is a diagram for explaining an XML representation of the object data of the magazine information according to the preferred embodiment;

FIG. 9 is a table for explaining a list of object data of program information according to the preferred embodiment;

FIG. 10 is a table for explaining the list of object data of the program information according to the preferred embodiment;

FIG. 11 is a diagram for explaining an XML representation of the object data of the program information according to the preferred embodiment;

FIG. 12 is a diagram for explaining the XML representation of the object data of the program information according to the preferred embodiment;

FIG. 13 is a table for explaining a list of object data of item information according to the preferred embodiment;

FIG. 14 is a table for explaining the list of object data of the item information according to the preferred embodiment;

FIG. 15 is a diagram for explaining an XML representation of the object data of the item information according to the preferred embodiment;

FIG. 16 is a table for explaining a list of object data of pack item information according to the preferred embodiment;

FIG. 17 is a diagram for explaining an XML representation of the object data of the pack item information according to the preferred embodiment;

FIG. 18 is a table for explaining an example of a reference count management table for automatic deletion processing according to the preferred embodiment;

FIG. 19 is a table for explaining an example of basic rules concerning the automatic deletion processing according to the preferred embodiment;

FIG. 22 is a table for explaining an example of rules for automatically deleting a program from the MY Library in the automatic deletion processing according to the preferred embodiment;

FIG. 23 is a table for explaining an example of a My Library automatic deletion management table in the automatic deletion processing according to the preferred embodiment;

FIG. 24 is a diagram for explaining an XML representation of the My Library automatic deletion management table in the automatic deletion processing according to the preferred embodiment;

FIG. 26 is a table for explaining an example of rules for manually deleting a program from the My Library according to the preferred embodiment;

DESCRIPTION OF THE PREFERRED EMBODIMENTS

Figure 1:
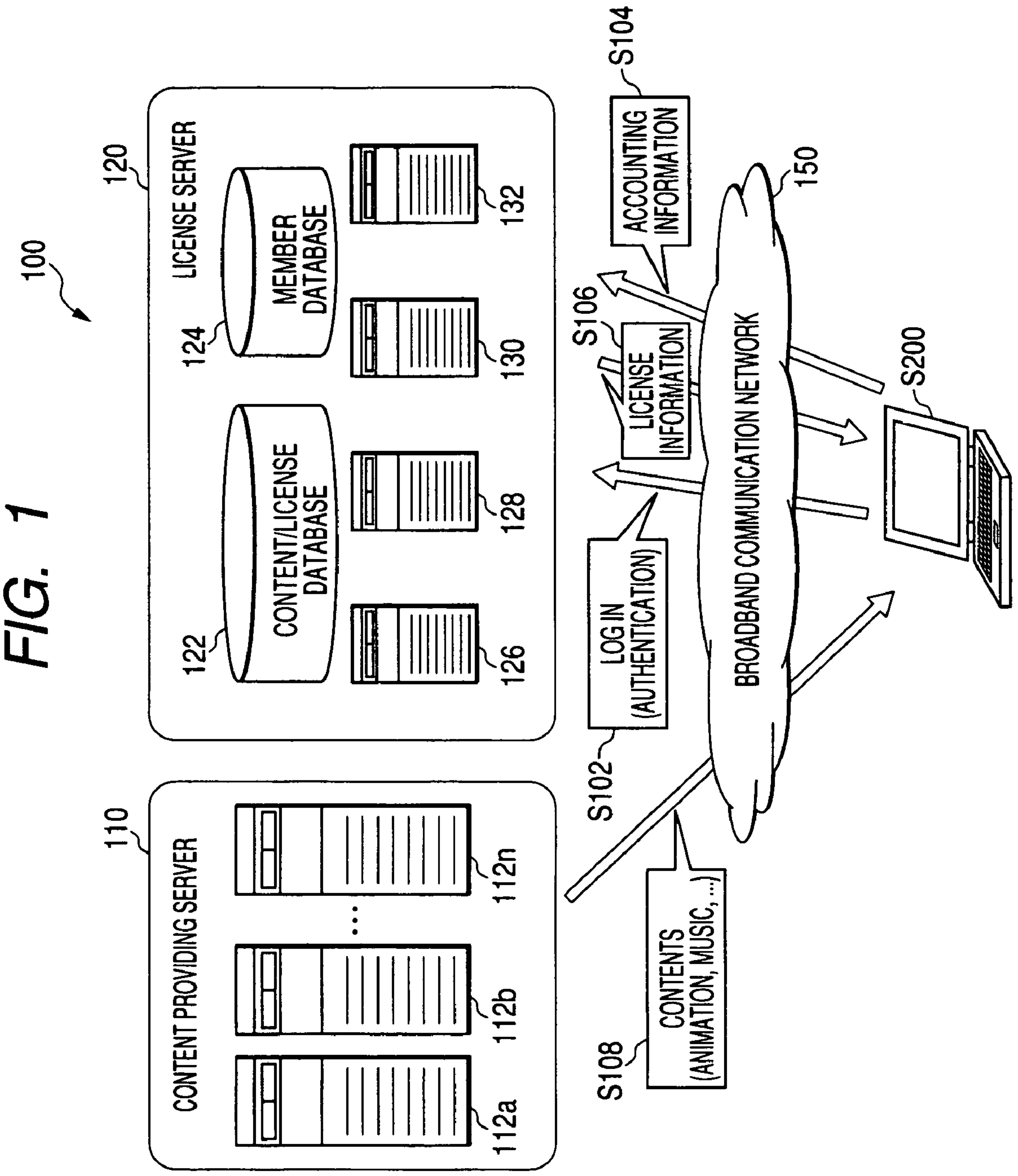
FIG. 1 is a block diagram showing a schematic structure of a content providing system according to a preferred embodiment of the invention.

A content providing system, a content providing server, an information processing apparatus, and a computer program stored on a computer readable medium according to a preferred embodiment of the invention will be hereinafter explained in detail with reference to the accompanying drawings. Note that, in the following explanation and the accompanying drawings, components having substantially identical functional structures are denoted by identical reference numerals and signal to omit repeated explanations of the components.

(1. System Structure)

First, a schematic structure of a content providing system 100 according to the preferred embodiment of the invention will be explained with reference to FIG. 1.

The content providing system 100 according to the preferred embodiment is applicable to a content providing service for delivering large capacity content data such as moving images through a large capacity high-speed communication network such as a broadband. The content providing system 100 mainly includes a content providing server 110, a license server 120, a broadband communication network 150, and a client 200.

The content providing server 110 is an information processing apparatus that is capable of providing content data to a client through a communication network according to a request from the client or according to an event that occurs regularly or irregularly. According to this embodiment, a method of delivering magazine information described later using electronic mail means or the like can be cited as an example of the event. The content providing server itself may store and manage the content data or a content data managing server, which stores and manages the content data, may be provided separately. In an example shown in the figure, in order to decentralize tasks, the content providing server 110 includes plural servers 120*a*, 120*b*, . . . , and 120*n*.

The license server 120 is an information processing apparatus that manages users and clients that use the content providing service. As shown in the figure, the license server 120 mainly includes a content/license database 122 that stores data concerning contents and licenses, a member database 124 that stores member information, a license management device 126 that manages licenses, an authentication device 128 that manages user authentication, an accounting management device 130 that manages accounting information, and a web server 132 that functions as a portal for users.

The communication network 150 is a public line network that makes it possible to perform tow-way communication. In this embodiment, since it is necessary to, for example, deliver large capacity content data, a large capacity high-speed communication network using an optical fiber or an ADSL, a so-called broadband communication network is adopted.

The client 200 is an information processing apparatus that is capable of acquiring content data, which is delivered from the content providing server through the communication network, in a streaming system or a download system. For example, the client 200 is an information terminal such as a personal computer, personal digital electronics, or a PDA. A detailed structure of the client 200 will be described later in relation to FIG. 2.

Figure 2:
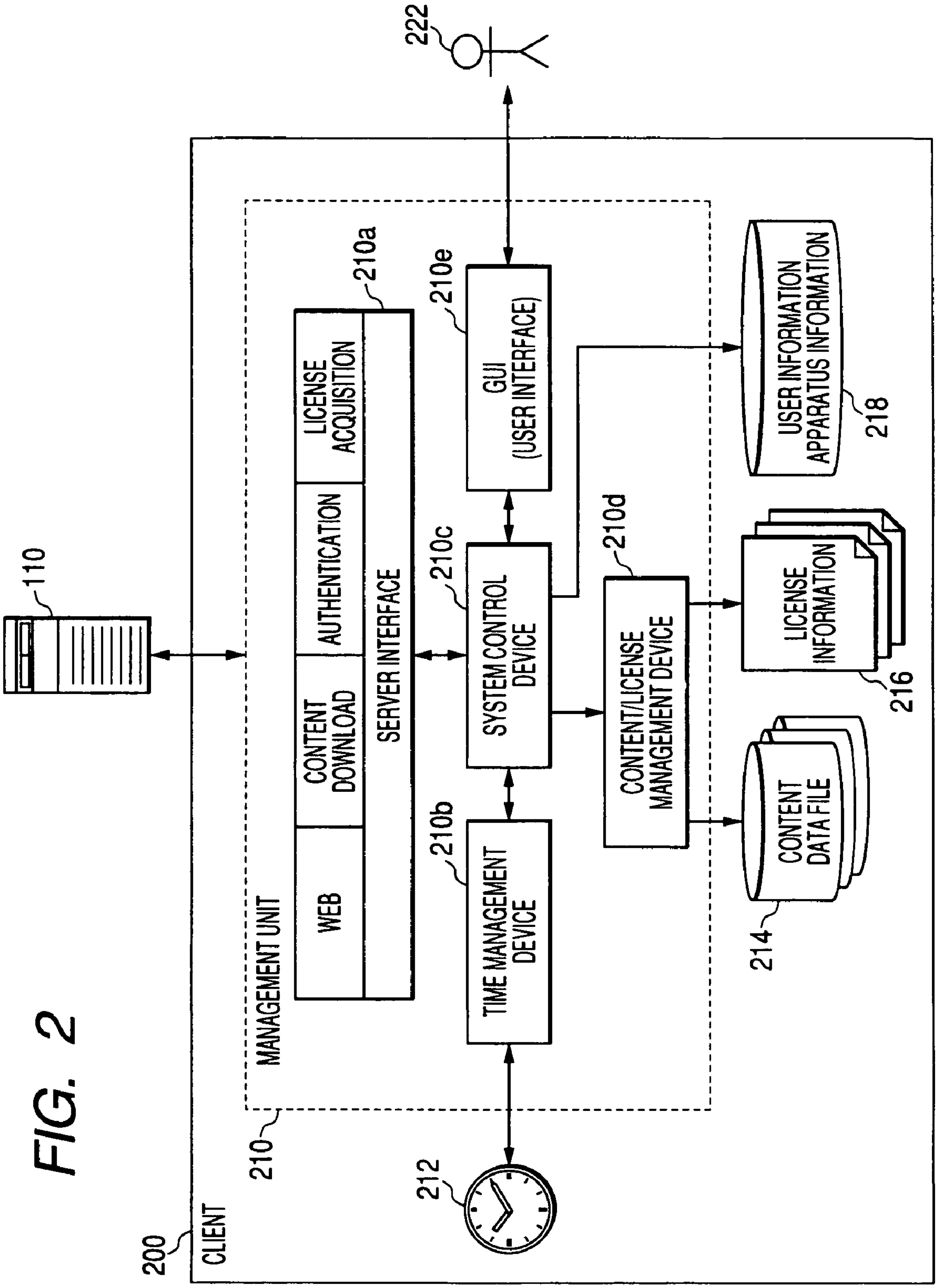
FIG. 2 is a block diagram showing a schematic structure of a client 200 according to the preferred embodiment.

FIG. 2 is a block diagram showing a schematic structure of the client 200 according to the preferred embodiment.

As shown in FIG. 2, the client 200 includes a management unit 210 that can be constituted as an application program for managing content data and information related thereto, a PC clock 212 that performs timer management for the client, a content data file 214 that stores downloaded content data, a license information file 216 that stores license information, and a user information/apparatus information file 218 that stores user information and apparatus information.

The management unit 210 can be downloaded from the content providing server 110 or the like through the communication network 150, mounted on the client 200 in advance, or installed via other storage media.

The management unit 210 mainly includes a server interface 210*a* that is capable of performing two-way communication with the content providing server 110 to download content data and information related thereto, a time management device 210*b* that receives a clock signal from the PC clock 212 and performs time management, a system control device 210*c* that performs control for the entire system, a user interface unit 210*e* that is constituted as a Graphical User Interface (GUI) for displaying a service content for a user 222 and receiving a request from the user 222, and a content/license management device 210*d* that manages contents and licenses in association with the content data file 214 and the license information file 216.

In using the content providing system, the user 222 can be provided with a service according to a procedure shown in FIG. 1. First, the user 222 accesses a web server 132 from the client 200 on the basis of magazine information, which is delivered on the basis of this embodiment and logs in the web server 132. The user 222 is authenticated by the authentication device 128 (S102). Subsequently, the user 222 selects desired content data out of the content data, which are managed by the content providing server 110, through the web server 132 and settles an account with the accounting management device 130 (S104). Thereafter, the user 222 receives a license from the license management device 126 (S106). Then, the content providing server 110 provides the user 222 with the desired content data (S108). Note that, in this embodiment, the content providing server 110 provides the user 222 with content data after the user receives a license. However, the invention is not limited to such an example. It is needless to mention that provision of content data and accounting processing can be performed in various ways according to a type of a service. For example, the user 222 is provided with content data first and, then, performs accounting processing to acquire a license or is provided with content data first and, then, performs accounting processing after acquiring a license.

Actually, when a user uses such a service, it is often difficult for the user to access desired content information. Thus, according to this embodiment, information on content data is provided to the user with a data structure like a magazine delivered regularly or irregularly. Consequently, the user is guided to content data that suits preference of the user or is recommended by a service provider to realize convenience for both the user and the service provider and prevent unnecessary redundant content data from being stored in a storage of a client.

Characteristics of the data structure according to this embodiment will be explained in detail with reference to FIG. 3 and the subsequent figures.

(2. Data Structure)

Figure 3:
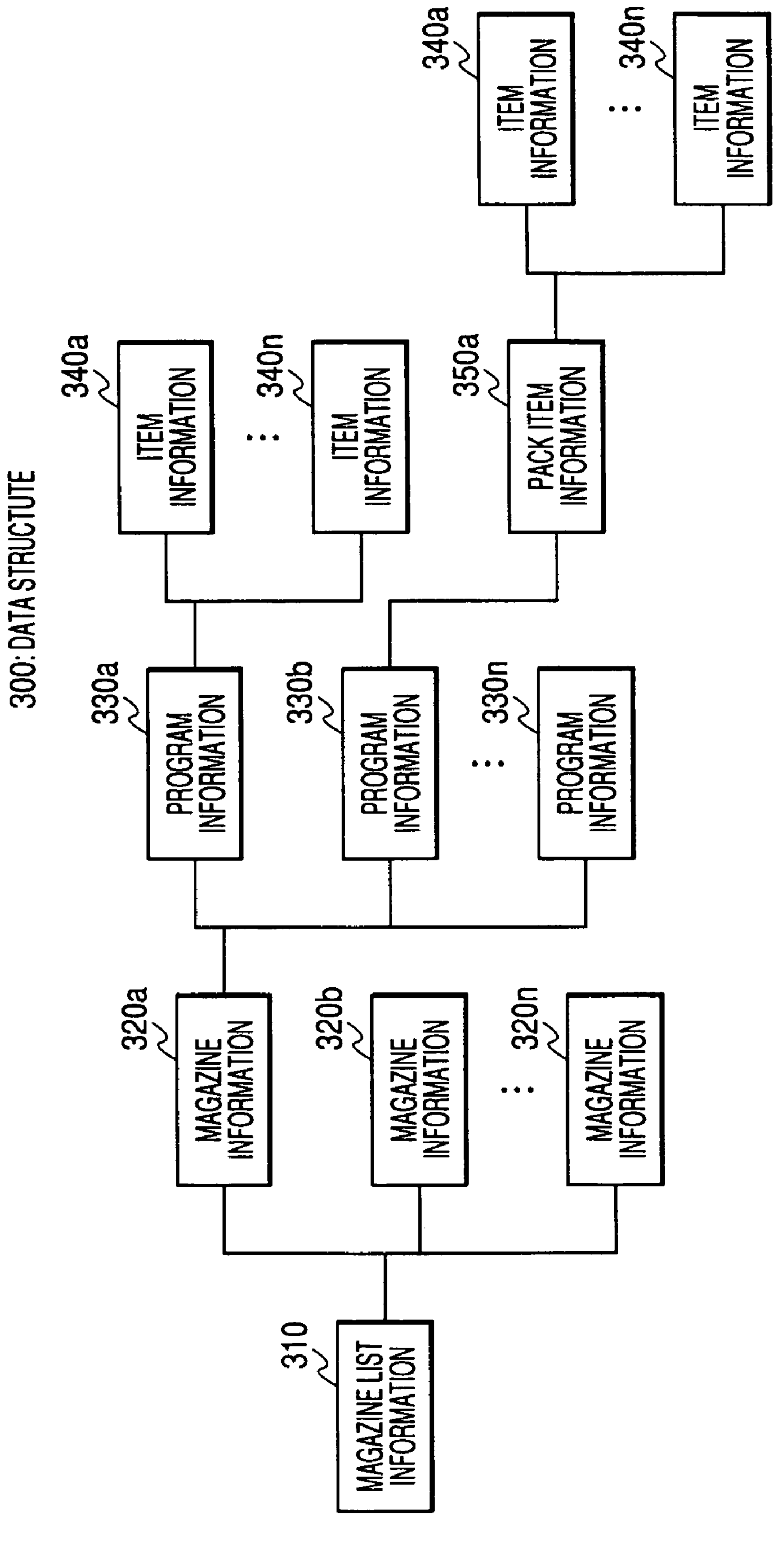
FIG. 3 is an explanatory diagram hierarchically showing a data structure that is adopted in a content data providing service according to the preferred embodiment.
Figure 4:
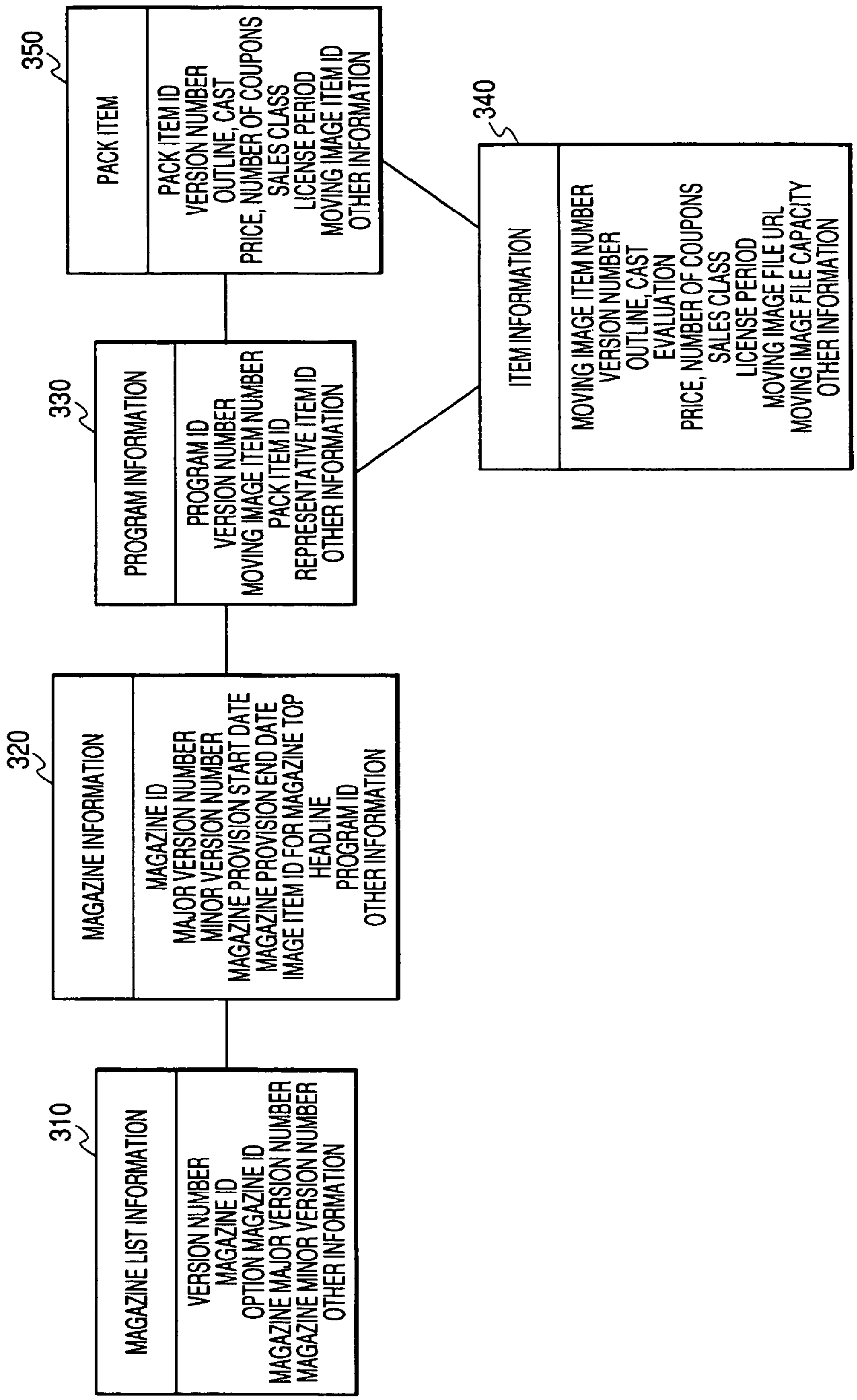
FIG. 4 is an explanatory diagram illustrating meta information of respective components of the data structure that is adopted in the content data providing service according to the preferred embodiment.

FIG. 3 is a diagram hierarchically showing a data structure 300 that is adopted in the content data providing service according to the preferred embodiment. FIG. 4 is a diagram showing an example of meta information included in respective hierarchical structures.

As shown in FIGS. 3 and 4, in the data structure 300, magazine list information 310 is arranged in an uppermost layer and magazine information 320 (320*a*, 320*b*, . . . , 320*n*), program information 330 (330*a*, 330*b*, . . . , 330*n*), and item information 340 (340*a*, 340*b*, . . . , 340*n*) are hierarchically arranged in layers subordinate to the magazine list information 310. Note that, as described later, it is also possible to group the item information 340 and arrange the item information 340 in a layer subordinate to the program information 330 as pack item information 350. In that case, the item information 340 and the pack item information 350 may be arranged in the same hierarchy, the item information 340 may be arranged in a hierarchy of the pack item information 350, or these arrangement structures may be adopted concurrently.

In this way, according this embodiment, content data, which is a service object product of the content data providing service, is divided into five pieces of information, namely, the magazine list 310, the magazine 320, the program 330, the item 340, and the pack item 350 and managed.

As a result, since a user can obtain information of the content data in a data structure like a magazine complying with a certain broader term (an edition policy), it is easy to find information matching preference of the user. In addition, a service provider can increase efficiency of use of a service by providing the user with content data, to which the service provider wishes to guide the user, in an arranged form.

The data structures shown in FIGS. 3 and 4 are characterized in that subordinate information can be used in host information. As a result, it is possible to reduce an amount of download significantly. Thus, it is possible to save a communication network and resources on a client (an information processing apparatus) side significantly.

The respective pieces of information will be hereinafter described in detail with reference to examples of object data included in the respective pieces of information. Note that the respective pieces of information can be described in a meta language such as the XML (extensible Mark-up Language).

(2.1 Magazine List Information)

FIG. 5 shows an example of object data of magazine list information and FIG. 6 shows an example of an XML representation of the magazine list information.

The "magazine list" information is a list of content program catalogues (magazines), in which content program catalogues to be provided by the content providing service are listed. Usually, the magazine list information is stored in a storage of a client. The magazine list includes a list of basic magazines that are delivered to anybody and a list of contract magazines for which individuals subscribe.

The client monitors update of a version number of this magazine list information at the time of polling that is performed regularly or irregularly. The client detects addition, deletion, and update of a magazine from this magazine list information and performs addition, deletion, and update of magazine data held by the client. All magazines, which are provided by the content providing service, are arranged in an order of display in the magazine list. The client can filter the magazine list information and determine an order of display of the magazine list information on the basis of basic magazine information acquired from a common profile and contract magazine information acquired from an individual profile. The "individual profile" is management information for each user. In a server, the individual profile is managed in association with an ID of the user. The "common profile" is management information for all users.

The magazine list information includes the following information:

(1) a magazine list version, (2) a magazine ID, (3) a magazine major version, (4) a magazine minor version, and (5) other information.

(2.2 Magazine Information)

FIG. 7 shows an example of object data of magazine information and FIG. 8 shows an example of an XML representation of the magazine information.

The "magazine information" is a catalogue of content program information (a program), which is edited according to predetermined relevance, and is delivered to a client regularly or irregularly. Usually, the magazine information is stored in a storage of the client.

In the magazine, an ID number of a program included in the magazine is managed. The magazine is specified by an ID representing the magazine, a major version corresponding to a monthly issue of the magazine, and a minor version that is incremented every time the magazine is updated. Like a usual paper media magazine, the magazine has a provision start period and a provision end period. A user can only learn a content of a magazine before start of provision as a preliminary announcement of the magazine and may not be able to use the content. Similarly, the user may be restricted to access the content of the magazine after the provision end period.

The magazine information includes the following information:

(1) a magazine ID, (2) a magazine major version, (3) a magazine minor version, (4) a magazine provision start date, (5) a magazine provision end date, (6) moving image information for a magazine top, (7) magazine headline text data, (8) an ID of a program provided by a magazine, and (9) other information.

(2.3 Program Information)

FIGS. 9 and 10 show an example of object data of program information and FIGS. 11 and 12 show an example of an XML representation of the program information.

The "program" information is content program information. As the program information, content item information (an item) and a content item information pack (a pack item) are managed. Usually, an item or a pack item is selected and managed on the basis of a predetermined edition policy, for example, an edition policy such as movie introduction, production introduction drama introduction, or sports introduction. Information on functional icons for starting various tasks such as display, update, addition, and deletion of an item or a pack item or download of content data is embedded in meta information of a program.

A flag indicating whether a moving image item among plural moving image items included in a program is a moving image item representing the program is also included in meta information of the program. Retrieval, registration in a preference area (a My Library), and the like are performed by a unit of program in principle. In this way, since a program is the central core of a data structure according to this embodiment, it is necessary to manage a download status of the program in an individual area of a client.

The program information includes the following information;

(1) a program ID, (2) a program version, (3) an ID of an item included in a program, (4) an ID of a pack item included in the program, (5) an ID of a representative item, and (6) other information.

Representative item information is content item information (a representative item) that is representatively displayed on a display device or the like when plural pieces of content item information are associated with content program information (programs).

(2.4 Item Information)

FIGS. 13 and 14 show an example of object data of item information and FIG. 15 shows an example of an XML representation of the item information.

The item information is a concept for managing meta information related to object content data as "an item or a moving image item" in order to manage an object content such as a moving image file. In the item information, "product referral information", that is, an outline, a cast, evaluation, and the like at the time when an item is sold as a single item are managed. "Price information", that is, a price, the number of coupons, and a sales class at the time when an item is sold as a single item are also managed. Moreover, license information, that is, a license period at the time when an item is sold as a single item is also managed.

Moreover, it is necessary to manage a download status of an item in an individual area of a client according to this item information. Similarly, it is necessary to manage a term of validity of a license for a moving image item in the individual area of the client according to the item information.

The item information includes the following information:

(1) a moving image item ID, (2) an outline and a cast, (3) evaluation, (4) a price and the number of coupons, (5) a sales class (free of charge, charged, and basic service), (6) a license period, (7) a moving image file URL, (8) a moving image file capacity, and (9) other information.

(2.5 Pack Item Information)

FIG. 16 shows an example of object data of pack item information and FIG. 17 shows an example of an XML representation of the pack item information.

The pack item information is a concept for managing content item information (an item or a moving image item) that is grouped as, for example, a serial and is a concept that is introduced to improve convenience of a service by packing the content item information. A user can use content data for plural number of times such as a drama as a pack thoroughly. A service provider can increase opportunities for sales by packing related content data and providing the user with the content data.

In the pack item information, an ID number of a moving image item included in a pack item is managed. In the pack item information, in order to improve convenience in selling items as a pack item product, outlines, cast, evaluation, and the like of all the items or the respective items are managed. In the pack item information, price information, that is, a price, the number of coupons, and a sales class at the time when items are sold as a pack item are managed. In the pack item information, license information, that is, a license period at the time when items are sold as a pack item is also managed.

The pack item includes the following information:

(1) a pack item ID, (2) a version number, (3) an outline and a cast, (4) evaluation, (5) a price and the number of coupons, (6) a sales class (free of charge, charged, and basic service), (7) a license period, (8) an ID of a moving image item included in the pack item, and (9) other information.

(3. Deletion Processing for a Magazine)

(3.1 Schematic Explanation of the Deletion Processing)

As explained above, in using the content providing service according to this embodiment, the content data of a magazine format having the data structure described above is downloaded to a storage of a client. However, if all the content data and information related thereto are stored in the storage, hardware resources of the client are overloaded. Thus, processing for deleting unnecessary data among the data stored in the storage of the client is required. According to this embodiment, a technical specification for deleting unnecessary data efficiently is provided.

Deletion processing provided by this embodiment includes automatic deletion processing that is capable of deleting data without making a user conscious of the processing and without bothering the user and manual deletion processing in which a user deletes data intentionally.

The automatic deletion processing includes object deletion processing for deleting an unnecessary object (a magazine, a program, an item, a pack item, content data, etc.) from the storage of the client and "revocation" processing for deleting a license according to an instruction of a server.

In the automatic deletion processing, when a term of validity of a magazine expires, an object (a magazine, a program, an item, a pack item, content data, etc.) matching deletion conditions described later, a license, or both the object and the license are deleted from the storage of the client. In the deletion, an object for which a license is valid is not deleted automatically. An object of the automatic deletion is old content data stored in the magazine and the My Library. When the content data is deleted from the magazine and the My Library, data is also deleted from information of management information (a program, an item, and a pack item) related to the content data.

The revocation processing is processing for deleting a license issued to the client once and a content simultaneously according to an instruction from the server. The service provider informs the user, with means such as an electronic mail, that revocation has been performed.

(3.2 Automatic Deletion Processing for a Magazine)

(3.2.1 Basic Rules)

In a client terminal, deletion processing for a "magazine" is performed when a term of provision of the magazine expires. When the deletion processing for the magazine is performed, a "program" belonging to the magazine and information subordinate to the program are also deleted as required. Dependency of the magazine, the program, and the information is managed by a concept called a "reference count". Information on the reference count is managed as "reference count management information" shown in FIG. 18.

The "program" is referred to from the "magazine" and the "My library".

The "pack item" is referred to only form the "program".

The "item" is referred to from the "program" and the "pack item".

The "program" is registered in the "My Library". When the "program" belongs to two magazines, a reference count of the "program" is "3".

When the "program" or the "magazine" is deleted, a reference count of the "pack item" or the "item", to which the "program" or the "magazine" refers, is decremented. When the reference count reaches "0", it is possible to delete information. The decrement is processed recursively from host information to subordinate information.

When the magazine is deleted, meta data of the magazine, meta data of the program, and meta data of the pack item are deleted unless the meta data are not referred to be other objects. It is determined on the basis of a magazine deletion rule table shown in FIG. 19 whether meta data of the item, a moving image reproduction license, and an entity of moving image data should be deleted. As shown in the figure, basically, the item, the moving image reproduction license, and the moving image data are not deleted when the magazine is referred to. The moving image data is deleted when the magazine is not referred to. The license is deleted only when the license has expired and the magazine is not referred to.

Figure 20:
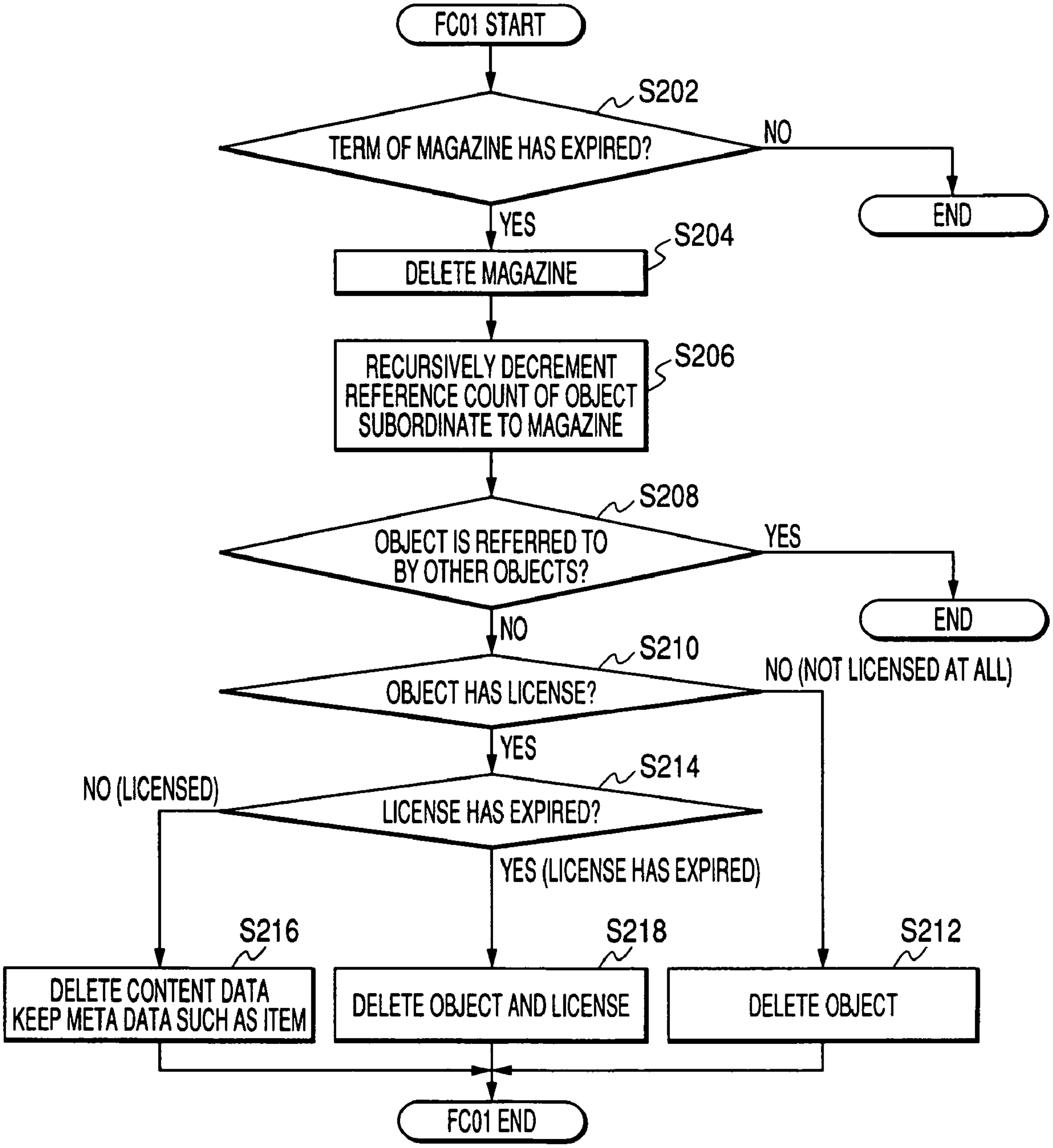
FIG. 20 is a flowchart showing a flow of the automatic deletion processing according to the preferred embodiment.

A flow of the automatic deletion processing according to this embodiment will be explained with reference to FIGS. 20 and 21. Note that a flow (FC01) shown in FIG. 20 is a flow in the case in which a deletion object is not referred to from the My Library. A flow (FC02) shown in FIG. 21 is a flow in the case in which a deletion object is referred to from the My Library.

As shown in FIG. 20, through polling or the like, a management unit checks regularly or irregularly whether a term of availability of a magazine has expired (S202). If the term of the magazine has expired, the management unit performs deletion processing for the magazine (S204). Moreover, in order to automatically delete an object (a program, an item, a pack item, content data, etc.) related to the magazine to be deleted, the management unit decrements a reference count of the object (a program, an item, a pack item, content data, etc.) subordinate to the magazine recursively on the basis of the reference count management table shown in FIG. 18 (S206).

Subsequently, the management unit judges whether the object to be deleted is referred to from other objects (S208). If the object to be deleted is referred to from other objects, the deletion is suspended. If the object to be deleted is not referred to from other objects, the management unit judges whether the object to be deleted has a license (S210). If the object to be deleted has no license, the management unit deletes the object (S212). On the other hand, if the object to be deleted has a license, the management unit judges a term of validity of the license (S214). If the term of validity of the license has expired, the management unit deletes both the object and the license (S218). On the other hand, if the term of validity of the license still remains, the management unit deletes only content data of the object to be deleted (S216) In this case, during a license period, a user can download the content data again and view a content using the remaining license as required.

Figure 21:
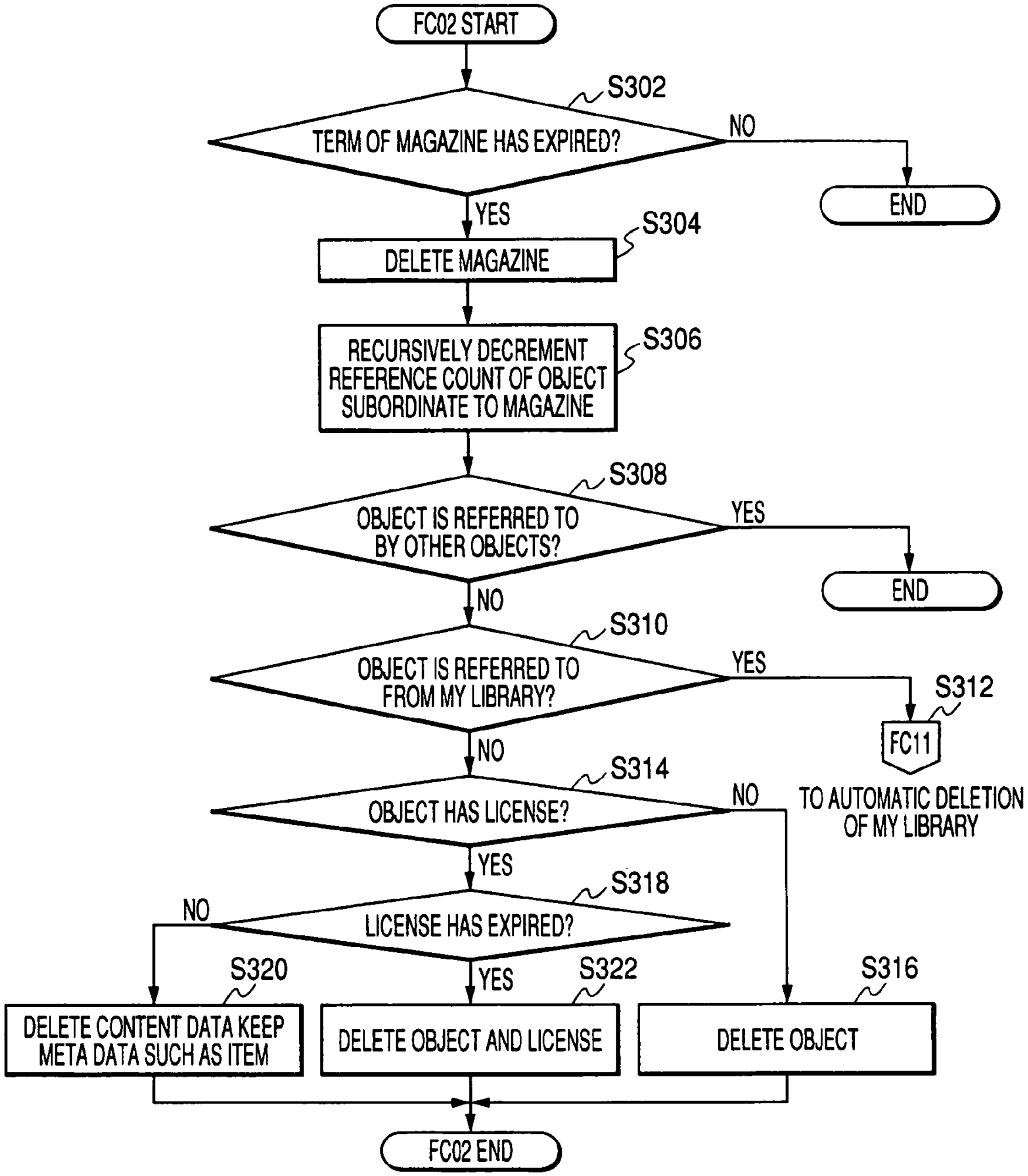
FIG. 21 is a flowchart showing a flow of the automatic deletion processing (in which an object is referred to from a My Library) according to the preferred embodiment.

FIG. 21 shows a flow (FC02) of deletion processing in the case in which an object to be deleted is referred to from the My Library. As in the deletion processing flow (FC01), through polling or the like, the management unit regularly or irregularly checks whether a term of availability of a magazine has expired (S302). If the term of the magazine has expired, the management unit performs deletion processing for the magazine (S304). Moreover, in order to automatically delete an object (a program, an item, a pack item, content data, etc.) related to the magazine to be deleted, the management unit decrements a reference count of the object (a program, an item, a pack item, content data, etc.) subordinate to the magazine recursively on the basis of the reference count management table shown in FIG. 18 (S306).

Subsequently, the management unit judges whether the object to be deleted is referred to from other objects (S308). If the object to be deleted is referred to from other objects, the deletion is suspended. If the object to be deleted is not referred to from other objects, the management unit judges whether the object to be deleted is referred to from the My Library (S310). If the object to be deleted is referred to from the My Library, the management unit proceeds to a deletion processing flow (FC11) for deleting a program from the My Library described later (S312). On the other hand, if the object to be deleted is not referred to from the My Library, the management unit judges whether the object to be deleted has a license (S314). If the object to be deleted has no license, the management unit deletes the object (S316). On the other hand, if the object to be deleted has a license, the management unit judges a term of validity of the license (S318). If the term of validity of the license has expired, the management unit deletes both the object and the license (S322). On the other hand, if the term of validity of the license still remains, the management unit deletes only content data of the object to be deleted (S320). In this case, during a license period, a user can download the content data again and view a content using the remaining license as required.

(3.3 Deletion Processing for Deleting a Program from the My Library)

(3.3.1 Automatic Deletion Processing)

Figure 25:
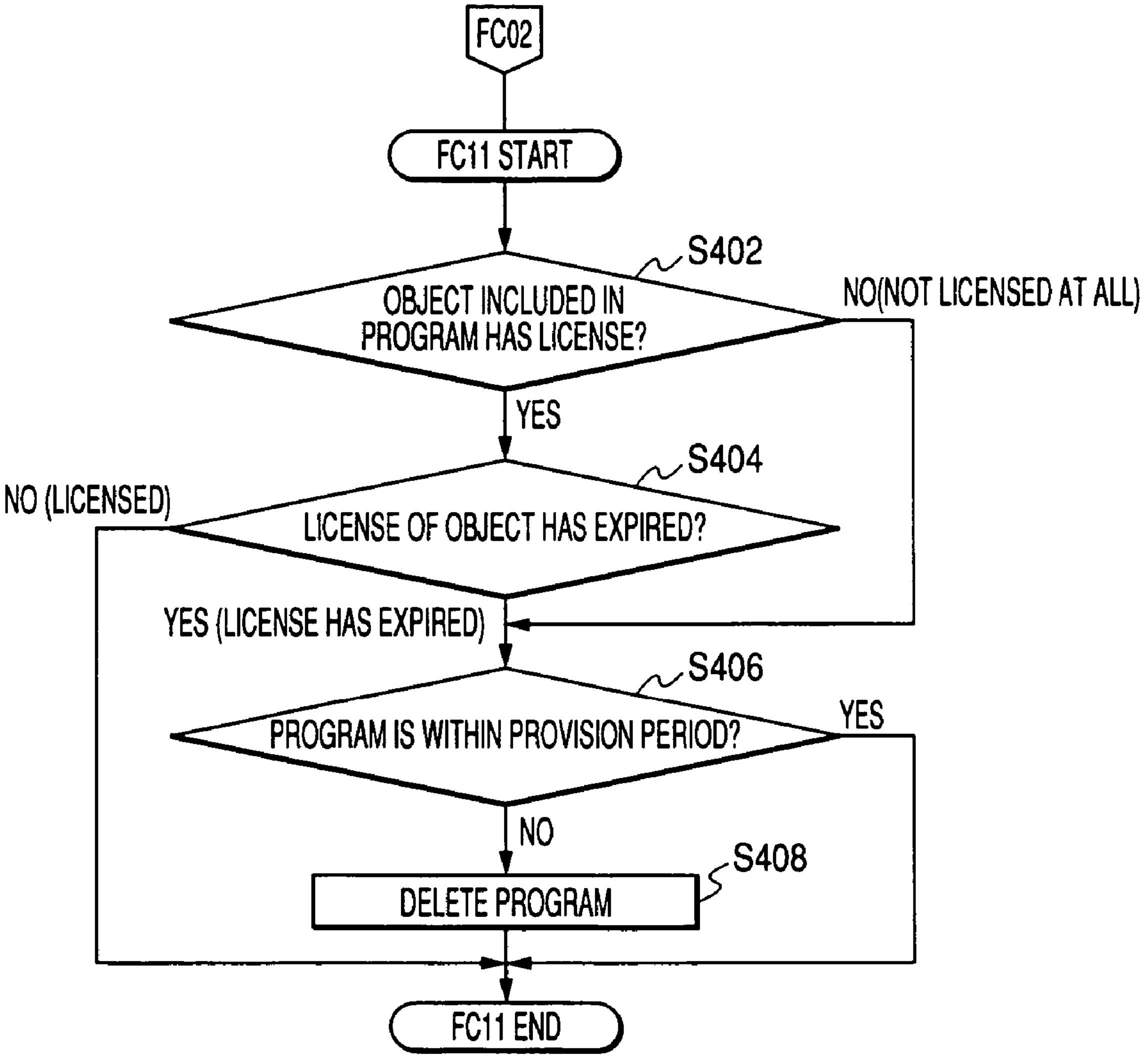
FIG. 25 is a flowchart showing a flow for automatically deleting a program from the My Library in the automatic deletion processing according to the preferred embodiment.

It is also possible to delete a program stored in the My Library according to automatic deletion. It is judged whether a program should be automatically deleted according to presence or absence of the program, a provision period of the program, and presence or absence of magazine reference and automatic deletion rules shown in FIG. 22. Program, which is judged to be deleted according to the automatic deletion rules shown in FIG. 22, are deleted step by step. An entity of moving image data (content data) is deleted N days after the program is referred to only from the My Library finally and a last license lapses. Meta data (an item) is deleted M days after the program is referred to only from the My Library finally and a last license lapses. Note that management for automatic deletion for deleting a program from the My Library is performed on the basis of a "My Library automatic deletion management table" shown in FIG. 23. Note that "N days"

represents the number of days of grace from the last acquisition of the license until the deletion of the moving image data. "M days" represents the number of days of grace from the last acquisition of the license until the deletion of the meta data. These numerical values can be set arbitrarily on the basis of the "My Library automatic deletion management table" shown in FIG. 23. FIG. 25 shows an example of an XML representation of the My Library automatic deletion management table.

With reference to FIG. 25, an automatic deletion flow for deleting a program from the My Library will be explained with reference to FIG. 25. first, in performing automatic deletion of a program from the My Library, the management unit judges whether a license is set in an object to be deleted (an item, a pack item, content data, etc.) included in the program (S402). If a license is not present, the management unit judges whether the program is within a provision period (S406). If the provision period has elapsed, the management unit deletes the program (S408).

On the other hand, when a license is present, the management unit judges a term of validity of the license (S404). If the license is within the term of validity, the management unit does not perform deletion processing for the program. On the other hand, when the term of validity of the license has expired, the management unit judges whether the program is within a provision period (S406). If the program is within the provision period, the management unit does not perform the deletion processing for the program. If the provision period has elapsed, the management unit performs the deletion processing for the program (S408).

(3.3.2 Manual Deletion Processing)

A user can delete a program manually from the My Library as required. When the user deletes the program from the My Library manually, all moving image data (content data) related to the program are deleted. Note that it is determined whether meta data of an item and a moving image reproduction license should be deleted on the basis of rules for "manual deletion of a program from the My Library" shown in FIG. 26. Note that the rules shown in FIG. 26 are the same as the rules for automatic deletion of a magazine already described in relation to FIG. 19. Note that, when the user deletes a program from the My Library, if moving image data related to the program is being downloaded, the user performs the automatic deletion after suspending the download.

(3.3.2.1 Example of a Screen Structure for Manual Deletion)

Actually, the user performs the manual deletion of a program from the My Library with reference to a My Library screen. An example of a screen structure for manual deletion according to the My Library screen will be hereinafter explained.

(3.3.2.2 My Library Screen)

Figure 27:
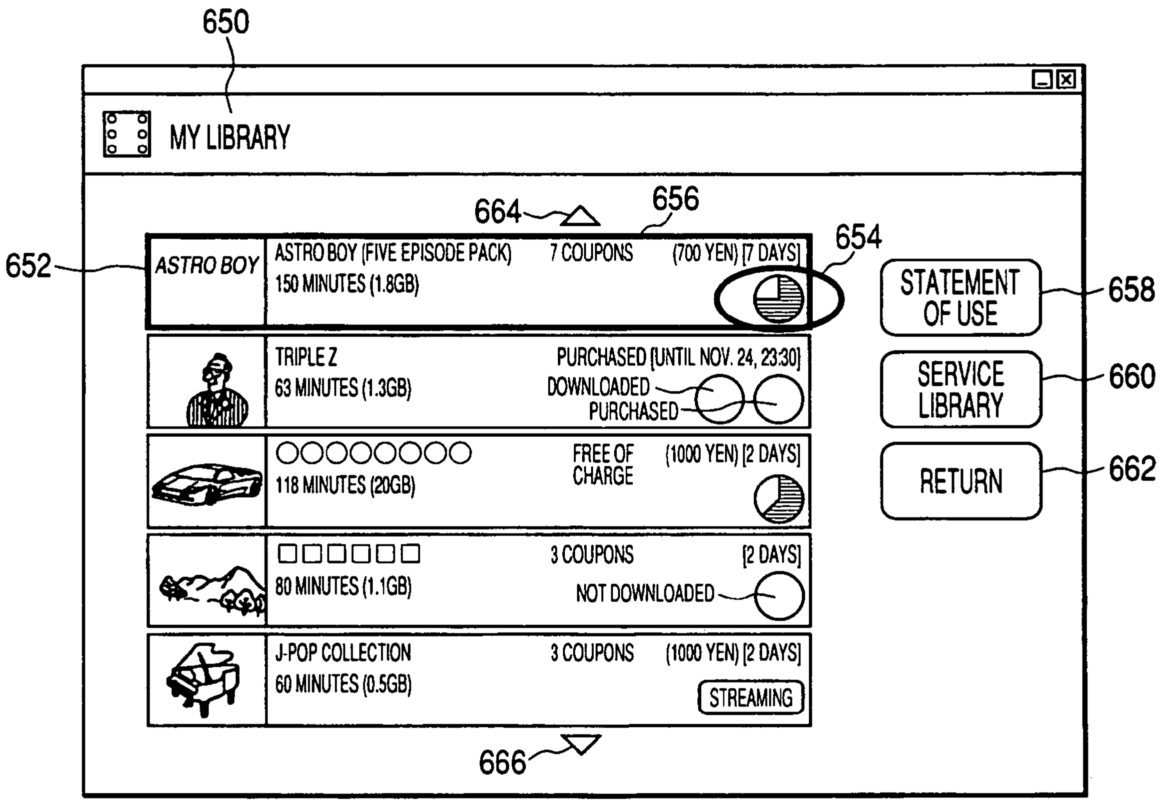
FIG. 27 is a diagram for explaining an example of a screen structure of a "My Library screen" for displaying a data structure on a display device according to the preferred embodiment.
Figure 28:
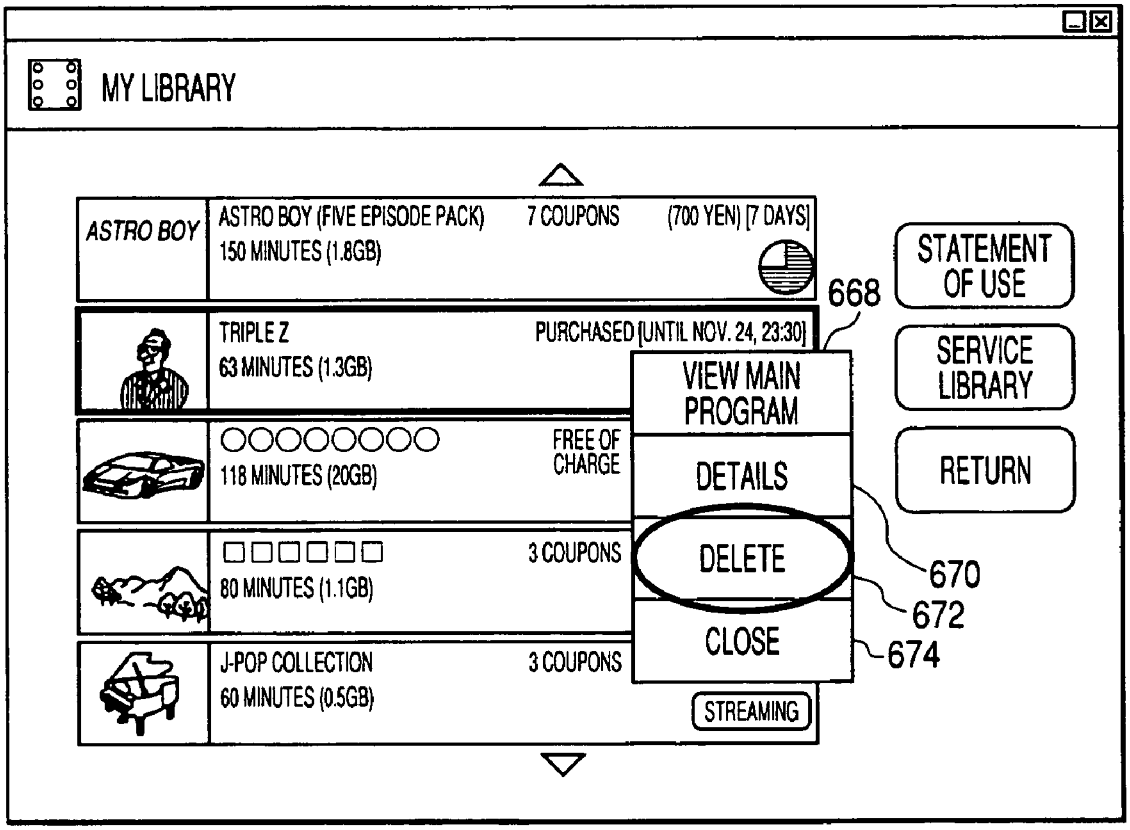
FIG. 28 is a diagram for explaining an example of a screen structure of the "My Library screen" for displaying a data structure on a display device according to the preferred embodiment.
Figure 29:
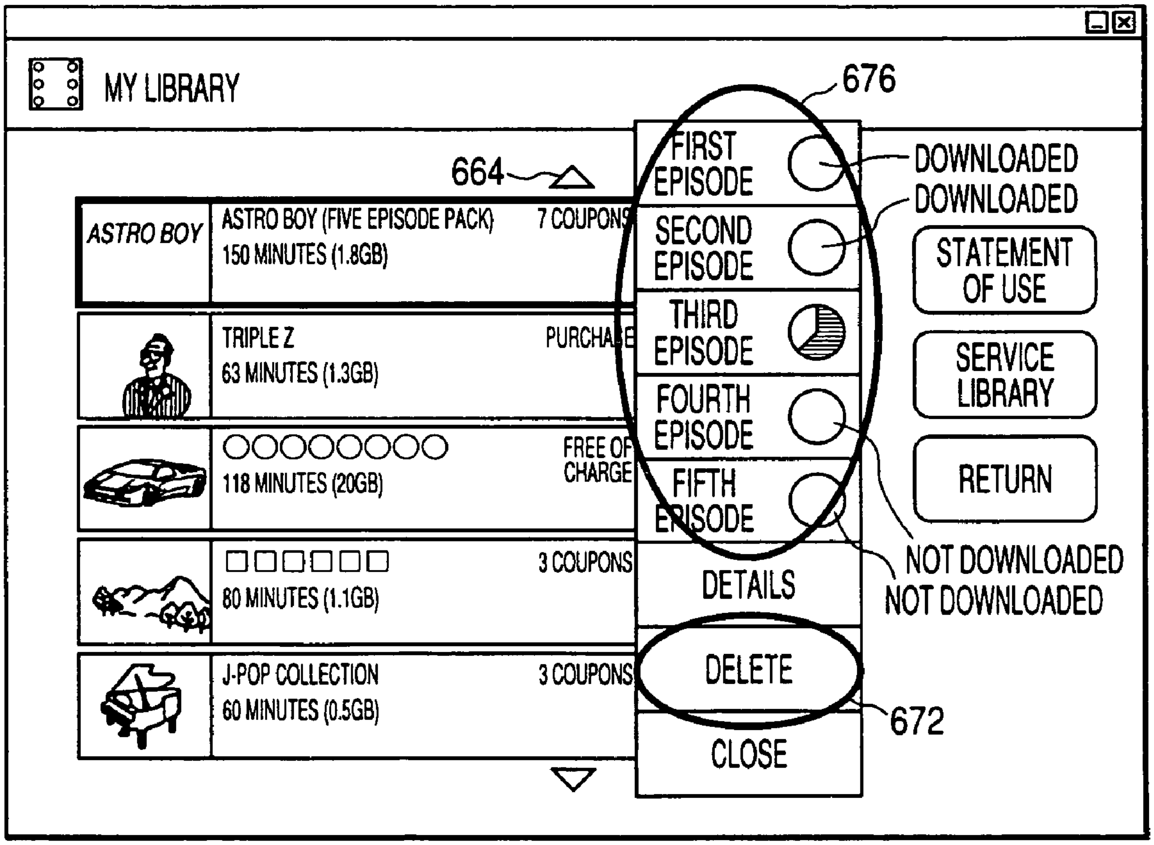
FIG. 29 is a diagram for explaining an example of a screen structure of the "My Library screen" for displaying a data structure on a display device according to the preferred embodiment.

FIGS. 27 to 29 show examples of a screen structure of the My Library screen.

A title of this screen, that is, "My Library" is displayed in a "title" area 650.

A title of a work registered in the My Library is displayed in a "title of work" area 652 together with a replay time and a capacity. When the title is not displayed fully in the area, the title is abbreviated with " . . . " attached to the end of the abbreviated title. When a work is selected, as shown in FIG. 28, a sub-list including a "view main program" icon 668, a "detail" icon 670, a "delete" icon 672, and a "close" icon 674 is displayed. Note that, in the case of a moving image pack, a sub-list including the "detail" icon 670, the "delete" icon 672, the "close" icon 674, and a "moving image pack name" icon is displayed.

In a "status of content main body" area 654, time until completion of download of the main program and the like are displayed. More specifically, it is indicated whether the main program has not been downloaded, the main program is being downloaded, the main program has been downloaded, or streaming of the main program is performed.

In a "necessary number of coupons, price/bonus, and term of validity of license" area 656, a necessary number of coupons, a price/a bonus, a term of validity of a license held by the user, and the like are displayed.

When a "statement of use" icon 658 is depressed, a web browser is started in order to display a statement of use for this month. A link to the statement of use is set in a designated site.

When a "service library" icon 660 is depressed, the My Library screen shifts to a screen for accessing a library that is supplied by the content providing service.

A "return" icon 662 is a functional icon for shifting the My Library screen to an immediately preceding screen.

An "up" icon 664 is a functional icon for skipping list information of the My Library upward.

A "down" icon 666 is a functional icon for skipping list information of the My Library downward.

The "view main program" icon 668 is a functional icon for viewing a main program. When the main program has not been downloaded, the My Library screen shifts to a download confirmation alert screen (not shown). When the main program has been downloaded, if the icon is depressed, the My Library screen shifts to a main program screen. When the main program is being downloaded, if the icon is depressed, the My Library screen shifts to a downloading alert screen.

The "detail" icon 670 is a functional icon for shifting the My Library screen to a program (movie introduction page) screen when the icon is depressed.

Figure 31:
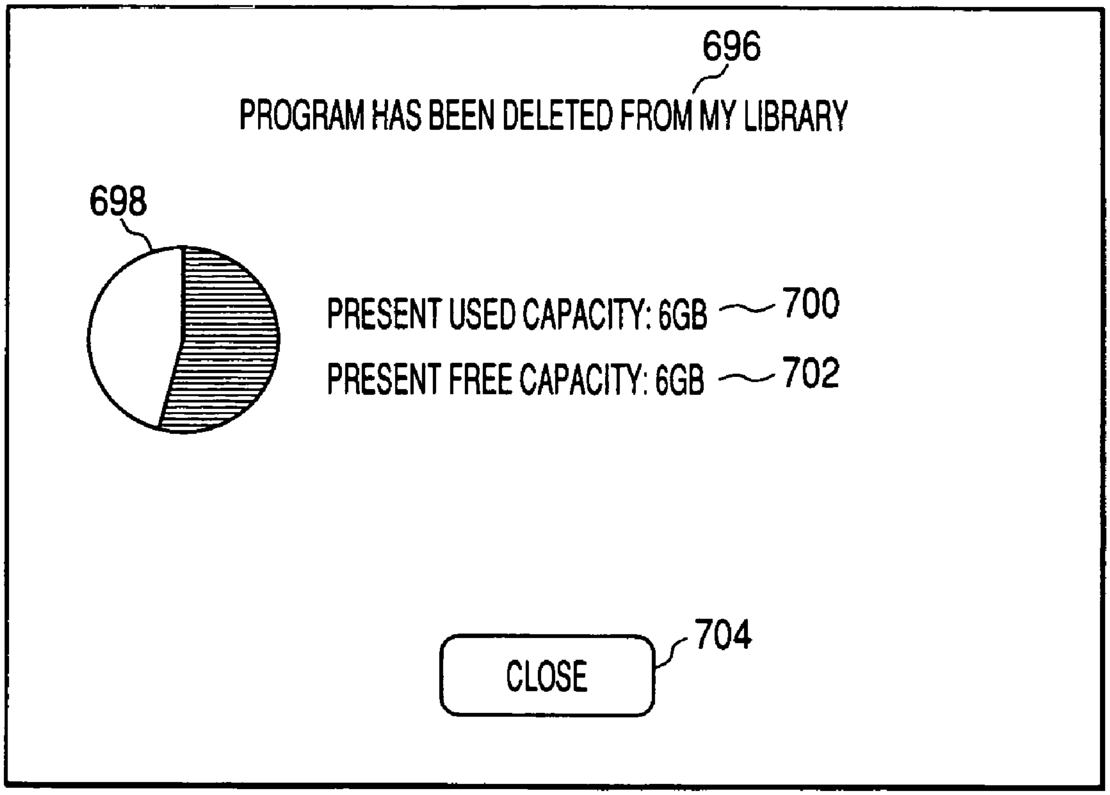
FIG. 31 is a diagram for explaining an example of a screen structure of the "deletion screen for a My Library" for displaying a data structure on a display device according to the preferred embodiment.

The "delete" icon 672 is a functional icon for deleting a selected program from the My Library. In the case of a moving image pack, it is possible to delete all episodes collectively. When a user depresses the "delete" icon 672, a deletion screen shown in FIG. 31 is displayed and the manual deletion processing for a program in this embodiment is carried out.

The "close" icon 674 is a functional icon for closing a sub-list.

A "moving image pack name/status" icon 676 is a functional icon for displaying a title of a moving image pack. When the icon is depressed, if the moving image pack has been downloaded, viewing of a moving image pack item is performed. In other cases, a download alert screen is displayed. If the image pack is being downloaded, time until completion of download of the moving image pack is displayed. As a status, any one of not-downloaded, being-downloaded, and downloaded can be displayed.

(3.3.2.3 Screen for Deletion of a Program from the My Library)

Figure 30:
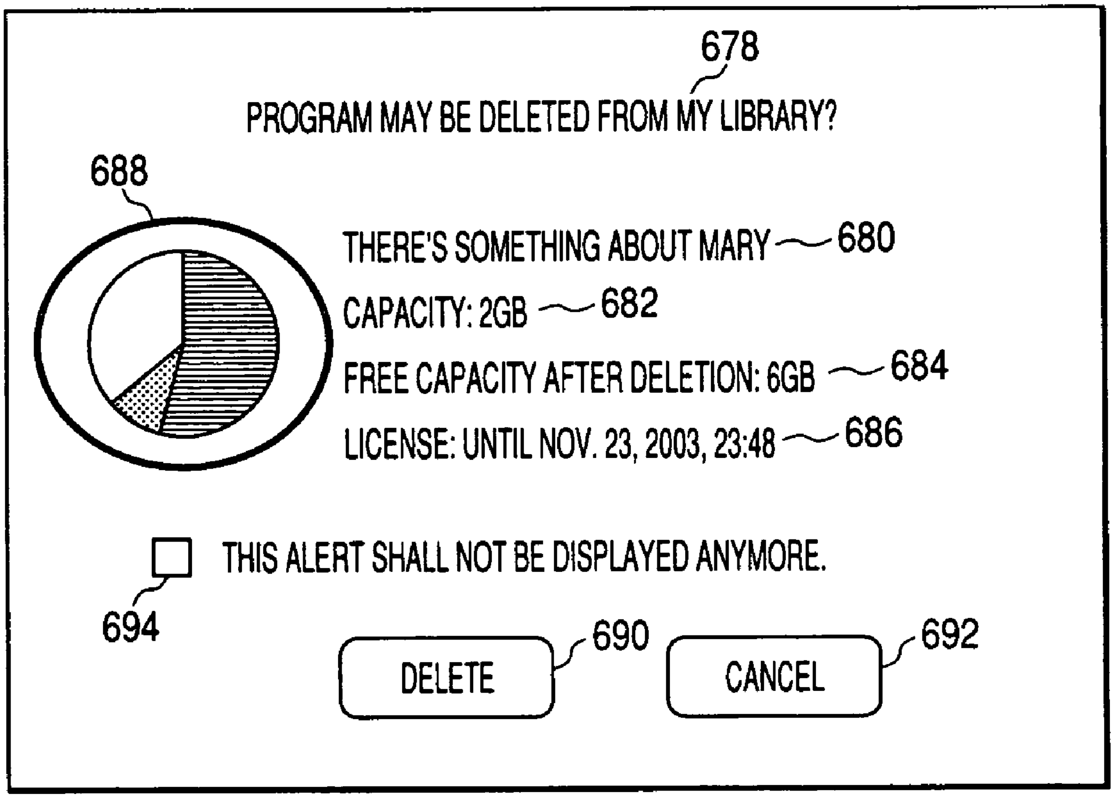
FIG. 30 is a diagram for explaining an example of a screen structure of a "deletion screen for a My Library" for displaying a data structure on a display device according to the preferred embodiment.

FIGS. 30 and 31 show examples of a screen structure of a screen for deletion of a program from the My Library. A user is capable of deleting a program, which is made unnecessary because viewing ends, from the My Library using this screen.

In a "message" area 678, a title of this screen, that is, a message for confirming deletion of a program from the My Library is displayed.

In a "deletion designation" area 680, a title of a work to be deleted is displayed.

In a "deletion capacity" area 682, a capacity of the work to be deleted is displayed.

In a "free capacity after deletion" area 684, a free capacity of a hard disk after deleting the work is displayed.

In a "term of validity of license" area 686, a term of validity of a license is displayed only in the case of a content for which the license is valid.

In a "capacity pie chart" icon 688, a still image of a pie chart indicating a total capacity, a deleted capacity, and a capacity after deletion is displayed. A "delete" icon 690 is a functional icon for deleting information on a designated work from the My Library and shifting a screen for confirmation of deletion of a program from the My Library to a screen for completion of deletion of a program from the My Library shown in FIG. 31. When a license for a content to be deleted is valid, the screen for confirmation of deletion of a program from the My Library is displayed forcibly.

A "cancel" icon 692 is a functional icon for canceling the deletion processing and shifting the screen for completing deletion of a program from the My Library to the screen for confirming deletion of a program from the My Library shown in FIG. 30.

A check box "this alert shall not be shown any more" 694 is a check box that functions such that the My Library screen does not shift to the confirmation screen any more. Usually, the check box 694 is set to OFF in default.

In a "message" area 696, a tile of this screen, that is, a message of completion of deletion of a program from the My Library is displayed.

In a "capacity pie chart" icon 698, a still image of a pie chart indicating a total capacity, a capacity in use, and a free capacity is displayed.

In a "present used capacity" area 700, a capacity of the storage currently used is displayed.

In a "present free capacity" area 702, a capacity of the storage currently unused is displayed.

A "close" icon 704 is a functional icon for closing this screen.

A user can delete an unnecessary program from the My Library while using the GUI explained above.

As explained above, according to this embodiment, when a term of availability of a content program catalogue (a magazine) has expired, the management unit deletes content program information (programs) included in the content program catalogue (the magazine) and/or content item information (items) included in the content program information (the programs) and/or content data included in the content item information (the items). Thus, unnecessary data are not accumulated in the storage and hardware resources of the client can be utilized effectively.

In deleting an object, a state of sharing or a state of reference to respective pieces of information is taken into account to maintain consistency of data. Thus, necessary objects are not deleted inadvertently.

The preferred embodiment of the invention has been explained with reference to the accompanying drawings. However, it is needless to mention that the invention is not limited to such an example. It should be understood by those skilled in the art that various modifications, combinations, sub-combinations and alterations may occur depending on design requirements and other factors insofar as they are within the scope of the appended claims or the equivalents thereof.

In particular, the terms "magazine list", "magazine", "program", "item", and "pack item" as used in this specification are used to facilitate understanding of the invention. In judging a technical scope of the invention, the technical scope should not be interpreted in a limited manner according to these terms. The examples of screen structures and the like are no more than examples. It is needless to mention that the screen structures and the like can be changed and applied in various ways according to forms of services.

The rules for manual deletion of a program from the My Library, the rules for automatic deletion of a program from the My Library, and the magazine deletion rules are only examples of the embodiment. It is needless to mention that the rules are described in a setting file and a client program reads the described file, whereby various rules can be applied.

As explained above, according to the invention, when a term of availability of a content program catalogue (a magazine) has expired, the management unit deletes content program information (a program) included in the content program catalogue (the magazine) and/or content item information (an item) included in the content program information (the program) and/or content data included in the content item information (the item). Thus, unnecessary content data are not accumulated in a storage and hardware resources of a client can be used effectively.

In deleting an object, a state of sharing or a state of reference to respective pieces of information is taken into account to maintain consistency of data. Thus, necessary objects are not deleted inadvertently.

The invention can be suitably applied to a content providing service that delivers large capacity content data such as moving images through a communication network.

What is claimed is:

1. A content providing system comprising:

a content providing server configured to deliver content data and information related thereto through a communication network;

a client that is capable of downloading the content data and the information related thereto through the communication network, the client including a storage unit configured to store the content; and a management unit, including a hardware processor, configured to manage meta information of the respective content data as content item information, to manage one or plural pieces of content item information as content program information in association with one another, to manage a reference count management table, and to manage one or plural pieces of content program information as a content program catalogue, one content data and meta information thereof can be referred to in plural pieces of content item information, one piece of content item information can be referred to in plural pieces of content program information, and one piece of content program information can be referred to in plural content program catalogues, the management unit is configured to maintain a reference count of each piece of information in the reference count management table, the reference count equal to a number of times each piece of information is referred to in other content program catalogues or content program information or content item information or content data, the management unit is configured to decrement the reference count when a reference to the information is removed, the management unit is configured to delete from the storage unit content program information included in the content program catalogue or content item information included in the content program information or content data included in the content item information when the management unit determines that a term of availability of the content program catalogue has expired and the reference count for the content program information is zero, and the management unit is configured to suspend deletion of the content program information or the content item information or the content data being referred to when the content program information to be deleted included in the content program catalogue or the content item information to be deleted or the content data to be deleted has a reference count greater than zero.

2. The system according to claim 1, wherein the management unit is configured to delete all references to the content program information, the content program catalog, or the content item information in the other content program catalogues or content program information or content item information or content data during suspension of deletion of the content program information, the content program catalogue, or the content item information to be deleted.

3. A system comprising:

a content providing server configured to deliver content data and information related thereto through a communication network; and a management unit, including a hardware processor, configured to manage the content data and the information, the management unit configured to manage meta information of the respective content data as content item information, to manage a reference count management table, to manage one or plural pieces of content item information as content program information in association with one another, and to manage one or plural pieces of content program information as a content program catalogue, one content data and meta information thereof can be referred to in plural pieces of content item information, one piece of content item information can be referred to in plural pieces of content program information, and one piece of content program information can be referred to in plural content program catalogues, the management unit is configured to maintain a reference count of each piece of information in the reference count management table, the reference count equal to a number of times each piece of information is referred to in other content program catalogues or content program information or content item information or content data, the management unit is configured to decrement the reference count when a reference to the information is removed, the management unit is configured to delete from a storage unit content program information included in the content program catalogue or content item information included in the content program information or content data included in the content item information when the management unit determines that a term of availability of the content program catalogue has expired and the reference count for the content program information is zero, and the management unit is configured to suspend deletion of the content program information or the content item information or the content data being referred to when the content program information to be deleted included in the content program catalogue or the content item information to be deleted or the content data to be deleted has a reference count greater than zero.

4. The system according to claim 3, wherein the management unit is configured to delete all references to the content program information, the content program catalog, or the content item information in the other content program catalogues or content program information or content item information or content data during suspension of deletion of the content program information, the content program catalogue, or the content item information to be deleted.

5. An information processing apparatus comprising:

a management unit, including a hardware processor, configured to manage content data and information related thereto delivered through a communication network, wherein the management unit configured to manage meta information of the respective content data as content item information, to manage a reference count management table, to manage one or plural pieces of content item information as content program information in association with one another, and to manage one or plural pieces of content program information as a content program catalogue, one content data and meta information thereof can be referred to in plural pieces of content item information, one piece of content item information can be referred to in plural pieces of content program information, and one piece of content program information can be referred to in plural content program catalogues, the management unit is configured to maintain a reference count of each piece of information in the reference count management table, the reference count equal to a number of times each piece of information is referred to in other content program catalogues or content program information or content item information or content data, the management unit is configured to decrement the reference count when a reference to the information is removed, and when a term of availability of the content program catalogue has expired, the management unit is configured to delete from a storage unit content program information included in the content program catalogue or content item information included in the content program information or content data included in the content item information when the management unit determines that a term of availability of the content program catalogue has expired and the reference count for the content program information is zero, and the management unit is configured to suspend deletion of the content program information or the content item information or the content data being referred to when the content program information to be deleted included in the content program catalogue or the content item information to be deleted or the content data to be deleted has a reference count greater than zero.

6. The information processing apparatus according to claim 5, further comprising:

a preference area in which desired content program information can be registered, wherein when the term of availability of a content program catalogue has expired, the management unit deletes content program information or content item information included in the content program information or content data included in the content item information included in the content program catalogue, the term of availability of which has expired, among the content program information registered in the preference area.

7. The information processing apparatus according to claim 5, wherein the management unit is configured to delete all references to the content program information, the content program catalog, or the content item information in the other content program catalogues or content program information or content item information or content data during suspension of deletion of the content program information, the content program catalogue, or the content item information to be deleted.

8. A computer readable medium including computer executable instructions, wherein the instructions, when executed by a processor, cause the processor to perform a method for managing a content and information related thereto, which are downloaded to a storage unit, with a management unit incorporated in an image processing apparatus, the method comprising:

the management unit manages meta information of the respective content data as content item information, manages a reference count management table, manages one or plural pieces of content item information as content program information in association with one another, and manages one or plural pieces of content program information as a content program catalogue, one content data and meta information thereof can be referred to in plural pieces of content item information, one piece of content item information can be referred to in plural pieces of content program information, and one piece of content program information can be referred to in plural content program catalogues, the management unit maintains a reference count of each piece of information in the reference count management table, the reference count equal to a number of times each piece of information is referred to in other content program catalogues or content program information or content item information or content data, the management unit decrements the reference count when a reference to the information is removed, the management unit deletes from the storage unit content program information included in the content program catalogue or content item information included in the content program information or content data included in the content item information when the management unit determines that a term of availability of the content program catalogue has expired and the reference count for the content program information is zero, and the management unit suspends deletion of the content program information or the content item information or the content data being referred to when the content program information to be deleted included in the content program catalogue or the content item information to be deleted or the content data to be deleted has a reference count greater than zero.

9. The computer readable medium according to claim 8, wherein the management unit is configured to delete all references to the content program information, the content program catalog, or the content item information in the other content program catalogues or content program information or content item information or content data during suspension of deletion of the content program information, the content program catalogue, or the content item information to be deleted.

* * * * *